(12) United States Patent
Doney et al.

(10) Patent No.: US 12,361,488 B2
(45) Date of Patent: Jul. 15, 2025

(54) METHOD, APPARATUS, AND COMPUTER-READABLE MEDIUM FOR COMPLIANCE AWARE TOKENIZATION AND CONTROL OF ASSET VALUE

(71) Applicant: Securrency, Inc., Annapolis, MD (US)

(72) Inventors: George Daniel Doney, Riva, MD (US); Ihor Yermakov, Arlington, VA (US)

(73) Assignee: DTCC DIGITAL (US) INC., Jersey City, NJ (US)

( * ) Notice: Subject to any disclaimer, the term of this patent is extended or adjusted under 35 U.S.C. 154(b) by 183 days.

(21) Appl. No.: 18/215,405

(22) Filed: Jun. 28, 2023

(65) Prior Publication Data

US 2023/0342849 A1 Oct. 26, 2023

Related U.S. Application Data

(63) Continuation-in-part of application No. 17/083,622, filed on Oct. 29, 2020, now abandoned, which is a
(Continued)

(51) Int. Cl.
*G06Q 30/00* (2023.01)
*G06Q 20/36* (2012.01)
(Continued)

(52) U.S. Cl.
CPC ......... *G06Q 40/04* (2013.01); *G06Q 20/3678* (2013.01); *G06Q 20/3821* (2013.01);
(Continued)

(58) Field of Classification Search
None
See application file for complete search history.

(56) References Cited

U.S. PATENT DOCUMENTS 9,256,763 B2 2/2016 Gajek
9,871,655 B2 1/2018 Camenisch et al.
(Continued)

FOREIGN PATENT DOCUMENTS

EP 3073670 A1 9/2016
GB 2517127 A 2/2015
(Continued)

OTHER PUBLICATIONS

Al Slamah—Security_Risk_Management; ICACIT 2017; pp. 119-124; 2017.*
(Continued)

*Primary Examiner* — Radu Andrei
(74) *Attorney, Agent, or Firm* — NEO IP

(57) ABSTRACT

An apparatus, computer-readable medium, and computer-implemented method to facilitate scalable compliance and issuer governance of decentralized financial transactions especially for the trade and transfer of tokenized securities. The resulting Compliance Aware Tokens contain the rulesets to restrict transactions and facilitate regulatory reporting and oversight. The embodied process, includes of a novel combination of compliance workflows, attribute verification tools, smart contracts and other ledger controls, provides a decentralized Attribute Based Access Control (ABAC) capability. ABAC patterns are extended to govern global financial transactions without the need for an active intermediary.

20 Claims, 9 Drawing Sheets

Related U.S. Application Data continuation of application No. 16/143,058, filed on Sep. 26, 2018, now Pat. No. 11,410,235.

(60) Provisional application No. 62/732,189, filed on Sep. 17, 2018, provisional application No. 62/563,684, filed on Sep. 27, 2017.

(51) Int. Cl.
- *G06Q 20/38* (2012.01)
- *G06Q 30/018* (2023.01)
- *G06Q 40/04* (2012.01)
- *G06Q 20/12* (2012.01)
- *G06Q 20/40* (2012.01)

(52) U.S. Cl.
CPC ......... *G06Q 20/389* (2013.01); *G06Q 30/018* (2013.01); *G06Q 20/1235* (2013.01); *G06Q 20/40* (2013.01); *G06Q 2220/00* (2013.01)

(56) References Cited

U.S. PATENT DOCUMENTS

| | | |
|---|---|---|
| 10,636,240 B2 | 4/2020 | Campero et al. |
| 10,699,340 B2 | 6/2020 | Gordon, III et al. |
| 10,956,904 B2 | 3/2021 | Collinge et al. |
| 11,010,754 B2 | 5/2021 | Campero et al. |
| 11,017,405 B2 | 5/2021 | Borzilleri et al. |
| 11,057,353 B2 | 7/2021 | Smith et al. |
| 11,107,049 B2 | 8/2021 | Hertzog et al. |
| 11,126,976 B2 | 9/2021 | Wright et al. |
| 11,188,899 B2 | 11/2021 | Yang |
| 11,201,751 B2 | 12/2021 | Unger et al. |
| 11,216,802 B2 | 1/2022 | Overholser et al. |
| 11,361,289 B1 | 6/2022 | Housser et al. |
| 11,443,379 B1 | 9/2022 | Gordon, III et al. |
| 11,509,464 B2 | 11/2022 | Gutierrez-Sheris |
| 11,522,700 B1 | 12/2022 | Auerbach et al. |
| 11,532,047 B2 | 12/2022 | Gordon, III et al. |
| 2007/0150936 A1* | 6/2007 | Maes ....................... H04L 67/10 726/1 |
| 2007/0156659 A1* | 7/2007 | Lim ................... G06F 21/6227 |
| 2007/0157288 A1* | 7/2007 | Lim ....................... H04L 63/105 726/1 |
| 2008/0010665 A1* | 1/2008 | Hinton .................... H04L 63/20 726/1 |
| 2009/0198996 A1* | 8/2009 | Lie .......................... H04L 63/08 713/155 |
| 2009/0249067 A1* | 10/2009 | Lie .......................... H04L 63/06 713/167 |
| 2011/0126197 A1* | 5/2011 | Larsen .................... G06F 21/31 718/1 |
| 2013/0132854 A1* | 5/2013 | Raleigh ................. G06F 3/0482 715/738 |
| 2013/0204894 A1 | 8/2013 | Faith et al. |
| 2015/0286969 A1* | 10/2015 | Warner ............. G06Q 10/0633 705/7.27 |
| 2015/0324787 A1 | 11/2015 | Schaffner |
| 2015/0356523 A1 | 12/2015 | Madden |
| 2016/0057168 A1* | 2/2016 | Reddock ............... H04L 63/105 726/1 |
| 2016/0283941 A1 | 9/2016 | Andrade |
| 2017/0011460 A1 | 1/2017 | Molinari et al. |
| 2017/0201850 A1* | 7/2017 | Raleigh ................... H04W 4/50 |
| 2017/0221288 A1 | 8/2017 | Johnson et al. |
| 2018/0041336 A1* | 2/2018 | Keshava ............... H04L 9/0891 |
| 2018/0069798 A1* | 3/2018 | Bacik ...................... H04L 47/20 |
| 2018/0083967 A1* | 3/2018 | Subramanian .......... H04L 63/10 |
| 2019/0080402 A1 | 3/2019 | Molinari et al. |
| 2019/0080404 A1 | 3/2019 | Molinari et al. |
| 2019/0188793 A1 | 6/2019 | Molinari et al. |
| 2020/0175501 A1 | 6/2020 | Vange |
| 2021/0042836 A1 | 2/2021 | Doney et al. |
| 2021/0357927 A1 | 11/2021 | Kita et al. |
| 2021/0374741 A1 | 12/2021 | Wood |
| 2021/0377225 A1 | 12/2021 | Smith et al. |
| 2022/0044316 A1 | 2/2022 | Gaur et al. |
| 2022/0103378 A1 | 3/2022 | Unger et al. |
| 2022/0277275 A1 | 9/2022 | Housser et al. |

FOREIGN PATENT DOCUMENTS

| | | |
|---|---|---|
| WO | 2017091530 A1 | 6/2017 |
| WO | 2018127923 A1 | 7/2018 |

OTHER PUBLICATIONS

Ferraro—Distributed Ledger Technology for Smart Cities; IEEE Access 2017, 19 pages 2017.*

* cited by examiner

JURISDICTION: US
ACCREDITED INVESTOR: YES
INSTITUTIONAL INVESTOR: NO

[REG D] (COUNTRY JURISDICTION=US)
  AND ((US ACCREDITATION=TRUE (<100)
  OR (US INSTITUTIONAL=TRUE))
OR
[REG S] (COUNTRY JURISDICTION!=US)
AND [READING ROOM DOCUMENT LIST]

FIG. 4

METHOD, APPARATUS, AND COMPUTER-READABLE MEDIUM FOR COMPLIANCE AWARE TOKENIZATION AND CONTROL OF ASSET VALUE

CROSS REFERENCES TO RELATED APPLICATIONS

This application is a continuation-in-part of U.S. application Ser. No. 17/083,622, filed Oct. 29, 2020, which is a continuation of U.S. patent application Ser. No. 16/143,058, now U.S. Pat. No. 11,410,235, filed Sep. 26, 2018, which claims the benefit of U.S. Provisional Application No. 62/732,189, filed Sep. 17, 2018 and U.S. Provisional Application No. 62/563,684, filed Sep. 27, 2017, each of which is hereby incorporated by reference in its entirety.

BACKGROUND OF THE INVENTION

1. Field of the Invention

The present invention relates to regulatory and policy compliance of certain transaction, and more specifically to streamlining compliant transfer of tokenized assets.

2. Description of the Prior Art

It is generally known in the prior art to provide a method for tokenizing assets and verify the identities of participants to a proposed transaction.

Prior art patent documents include the following:

U.S. Patent Publication No. 2022/0044316 for Blockchain implemented transfer of multi-asset digital wallets by inventors Gaur, et al., filed Aug. 4, 2020 and published Feb. 10, 2022, is directed to a processor that may analyze each instance of digital assets. The processor may identify, respectively, one or more rules that are applicable to each of the digital assets. The determination of the one or more rules is identified by a compliance mechanism. The processor may validate the one or more rules against each of the digital assets in context of a first user and a second user. The processor may endorse the transfer of the multi-asset digital wallet with a compliance mechanism signature.

U.S. Patent Publication No. 2021/0374741 for Compliance controller for the integration of legacy systems in smart contract asset control by inventor Wood, filed Jun. 1, 2020 and published Dec. 2, 2021, is directed to a platform that may be configured to perform one or more methods via one or more systems to provide smart contract control over asset administration and management, where regulatory regimes may require the use of systems and protocols that would not otherwise be smart contract compatible by way of legal standards and/or technical constraints. Embodiments may provide a compliance controller for integrating legacy system data and operations into a smart contract system in accordance with a regulated regime associated with an asset at the basis of the smart contract process. The platform may employ the compliance controller to interface the actions of the smart contract with the legacy systems associated with an asset controller operating outside of a blockchain corresponding to the smart contract. The asset controller may have off-chain control of the asset being administered and managed by the smart contract.

U.S. Patent Publication No. 2021/0357927 for Transaction authentication system and related methods by inventors KITA, et al., filed Sep. 17, 2019 and published Nov. 18, 2021, is directed to methods and systems for authenticating transactions on a token contract. A transaction rule compliance engine that utilizes stored user information to ensure that transactions of tokens associated with the token contract comply with defined ruleset. A curation system maintains the stored user information on the token contract or elsewhere on the blockchain system.

U.S. Pat. No. 11,201,751 for System and method for off-chain cryptographic transaction verification by inventors Unger, et al., filed Jul. 18, 2019 and issued Dec. 14, 2021, is directed to a system and method for determining transaction compliance in an off-chain environment to offload computationally-intensive compliance processes for cryptographical transactions. Systems and methods for providing consistency across multiple blockchains by not relying on the limitations of any given protocol to guarantee a cost of executing a transaction be kept to a minimum and keep an on-chain overhead minimal.

U.S. Patent Publication No. 2022/0103378 for System and method for off-chain cryptographic transaction verification by inventors Unger, et al., filed Dec. 12, 2021 and published Mar. 31, 2022 is directed to systems and methods for off-chain verification of cryptographic transactions. The system receives a first transaction from a first blockchain, wherein the first transaction is associated with a first address of a first user device and receives a notification of an analysis of a whitelist status for the first transaction. The system performs a first off-chain check on the first transaction to determine validity of the first transaction and if the first off-chain check fails, determines whether a second off-chain check is required. If the second off-chain check is required the system performs the second off-chain check and if the second off-chain check fails, determines whether a supervised check is required. If the supervised check is required, the system sends transaction parameters of the first transaction to a second user device and submits transaction details to the first blockchain if an approval is received from the supervisor user device.

U.S. Patent Publication No. 2019/0080404 for System and method for providing a timing feature to token offerings by inventors Molinari, et al., filed Sep. 10, 2018 and published Mar. 14, 2019 is directed to a method for generating a unique token associated with a profit participation parameter in an issuing entity for a token holder, the unique token being generated as a security according to a security regulation and being based on a determination of demand by token holders. The method includes implementing a smart contract on a blockchain to manage distributions from the issuing entity to the token holder according to the unique token, wherein the smart contract comprises a set of promises in digital form and comprises defined protocols for managing value distribution from the issuing entity to the token holder, and wherein one of the unique token and the smart contract comprises a timeframe associated with a restriction on selling the unique token, implementing a restriction on a sale of the unique token during the timeframe and enabling the sale of the unique token after the timeframe.

U.S. Patent Publication No. 2019/0188793 for System and method for providing escrow wallets and closing wallets for transactions by inventors Molinari, et al., filed Feb. 25, 2019 and published Jun. 20, 2019 is directed to a method for creating a seller escrow wallet. The seller escrow wallet only displays a content of the wallet, is non-custodial, maintains an ability to return tokens stored within the wallet to an original account via a request, transfers tokens purchased by the seller to the wallet, and utilizes a master wallet to facilitate a transfer of the tokens from the seller wallet to a buyer wallet associated with the buyer. Upon a sale of the tokens, the method includes moving the tokens from the seller wallet to the master wallet using addresses that identify at least one of the seller and the buyer, receiving a payment at the master wallet from the buyer for the tokens and upon receiving the payment at the master wallet, releasing the tokens to the buyer and transferring the payment to the seller.

U.S. Patent Publication No. 2019/0080402 for System and method for providing a regulatory-compliant token by inventors Molinari, et al., filed Apr. 20, 2018 and published Mar. 14, 2019 is directed to a method that includes generating a unique token associated with a profit participation parameter in an issuing entity for a token holder, the unique token being generated as a security according to a security regulation and being based on a determination of demand by token holders, implementing a smart contract on a blockchain to manage distributions from the issuing entity to the token holder according to the unique token, wherein the smart contract includes a set of promises in digital form and defined protocols for managing value distribution from the issuing entity to the token holder, receiving, via the smart contract, a revenue received by the issuing entity, issuing, via the smart contract and based on the revenue, to the token holder, a disbursement; and recording, by the smart contract, the disbursement and circumstances surrounding the disbursement on the blockchain.

U.S. Pat. No. 11,126,976 for Method and system for efficient transfer of cryptocurrency associated with a payroll on a blockchain that leads to an automated payroll method and system based on smart contracts by inventors Wright, et al., filed Feb. 16, 2017 and issued Sep. 21, 2021 is directed to blockchain technologies such as the Bitcoin blockchain, and the tokenisation of assets or entities. It is particularly suited for implementing a payroll on a blockchain platform and comprises a method and system of transferring cryptocurrency from a first node to a second node. Both nodes are associated with a payroll and have a respective asymmetric cryptography pair, each pair including a master private key and a master public key. Respective additional private and public keys may be determined based on the master private key, master public key and a generator value at each node. The additional private and public keys may form a hierarchical structure. A common secret may be determined at each of the nodes based on the additional private and public keys. The common secret may be used to securely transmit confidential information across a communications network.

U.S. Pat. No. 11,010,754 for Architecture for access management by inventors Campero, et al., filed May 15, 2017 and issued May 18, 2021 is directed to techniques that use devices with corresponding identity wallet applications that execute on an electronic processor device of the devices, and which identity wallets store identity information and encrypt the stored identity information. A distributed ledger system, and a broker system that interfaces to the wallet and the distributed ledger are used for various information exchange cases pertaining to access to facilities. In particular, disclosed is a registration process to register an identity wallet with a facility.

U.S. Pat. No. 10,636,240 for Architecture for access management by inventors Campero, et al., filed Oct. 1, 2019 and issued Apr. 28, 2020 is directed to techniques that render a graphical user interface on a display device for performing transactions with a security system. The techniques include listening by a user device for a beacon from the security system, the beacon including a message and imitating by the user device the transaction with the security system in response to the message, with the message causing the user device to render a graphical user interface that has fields for entering an email address and a password to register the user device with a security server, with the graphical user interface rendering on the display a public key stored in a user digital wallet and a user digital wallet identification and sending in response to the message, a user's public key that is stored in the user's wallet and which is embedded in a code.

U.S. Pat. No. 10,956,904 for System and method for end-to-end key management by inventors Collinge, et al., filed Jul. 25, 2016 and issued Mar. 23, 2021 is directed to a system and method for managing encryption keys used by a payment application on a mobile device. The method includes executing a mobile payment application in a user domain of the mobile device, where the user domain is an operating environment in which applications are executed and accessed by a user, importing a plurality of encryption keys for use by the mobile payment application into a system domain of the mobile device, where the system domain is a more secure operating environment controlled by an operating system, encrypting payment information of the mobile payment application in the system domain using one or more of the imported keys while executing the mobile payment application in the user domain, and transmitting the encrypted payment information to a merchant.

U.S. Pat. No. 11,188,899 for Off network identity tracking in anonymous cryptocurrency exchange networks by inventor Yang, filed Apr. 7, 2016 and issued Nov. 30, 2021 is directed to a method of facilitating identity information exchange in a cryptocurrency transaction. An information compliance computer system can receive a pending cryptocurrency transaction from a transmitter wallet service system for managing one or more user wallet accounts, each associated with one or more cryptographically verifiable addresses in a cryptocurrency exchange network. The information compliance computer system can identify a recipient wallet service system associated with a destination address indicated by the pending cryptocurrency transaction. Information compliance computer system can exchange identity information between the transmitter wallet service system and the recipient wallet service system. The information compliance computer system can publish the pending cryptocurrency transaction to the cryptocurrency exchange network for inclusion into a block chain of the cryptocurrency network.

U.S. Patent Publication No. 2016/0283941 for Systems and methods for personal identification and verification by inventor Andrade, filed Nov. 12, 2015 and published Sep. 29, 2016 is directed to a personal/client identification and verification process, pseudonymous system and transaction network for monitoring and restricting transactions of cryptography-based electronic money. The protocol provides a practical solution for the issues related to cryptocurrency theft, KYC and AML, while maintaining user privacy.

U.S. Pat. No. 9,256,763 for Method and system for providing a public key/secret key pair for encrypting and decrypting data by inventor GAJEK, filed Sep. 3, 2013 and issued Feb. 9, 2016 is directed to a method for providing a public key/secret key pair for encrypting and decrypting data, wherein the public key of the public key/secret key pair and a master secret key are generated based on predefined policy information, and wherein the secret key of the public key/secret key pair is generated based on the generated master secret key and predefined attribute information. A method for accessing a system in an untrusted environment and a system for providing a public key/secret key pair for encrypting and decrypting data as well as a use for access control are also described.

WIPO Publication No. 2018/127923 for Methods for exchanging and evaluating virtual currency by inventors Hertzog, et al., filed Jan. 8, 2018 and published Jul. 12, 2018 is directed to a secure ledger network for executing cryptocurrency transactions, the secure ledger network includes at least one hardware processor, a non-transitory machine-readable storage medium having an executable computer readable program code, the at least one hardware processor configured to execute the computer-readable program code to: receive, by the secure ledger network, a request to validate a smart contract that determines at least one rule for performing a transaction related to a first cryptocurrency token, wherein an execution of the transaction comprising determining a price of the first cryptocurrency token based on a status of the first cryptocurrency token, and a status of another cryptocurrency token; determine whether to validate the smart contract; when determining to validate the smart contract then updating a secure ledger maintained by the secure ledger network with the smart contract; receiving, by the secure ledger network, a request to execute a transaction related to the first cryptocurrency token; performing the transaction by executing, by the secure ledger network, the smart contract; and updating the secure ledger about a completion of the transaction.

U.S. Pat. No. 11,107,049 for Methods for exchanging and evaluating virtual currency by inventors Hertzog, et al., filed Nov. 19, 2020 and issued Aug. 31, 2021 is directed to a secure ledger network for executing cryptocurrency transactions, the secure ledger network includes at least one hardware processor, a non-transitory machine-readable storage medium having an executable computer readable program code, the at least one hardware processor configured to execute the computer-readable program code to: receive, by the secure ledger network, a request to validate a smart contract that determines at least one rule for performing a transaction related to a first cryptocurrency token, wherein an execution of the transaction comprising determining a price of the first cryptocurrency token based on a status of the first cryptocurrency token, and a status of another cryptocurrency token; determine whether to validate the smart contract; when determining to validate the smart contract then updating a secure ledger maintained by the secure ledger network with the smart contract; receiving, by the secure ledger network, a request to execute a transaction related to the first cryptocurrency token; performing the transaction by executing, by the secure ledger network, the smart contract; and updating the secure ledger about a completion of the transaction.

U.S. Pat. No. 11,532,047 for Blockchain instrument for transferable equity by inventors Gordon, et al., filed Jun. 24, 2020 and issued Dec. 20, 2022 is directed to systems and methods for offering and purchasing tokenized securities on a blockchain platform meeting current and future federal, state, and offering and holding entity rules and regulations. Tokenized securities purchased during or after the tokenized securities offering are tradable on a secondary market. The server computer of the tokenized securities provides an automated transfer capability for tokenized securities holders.

U.S. Pat. No. 11,443,379 for Blockchain instrument for transferable equity by inventors Gordon, et al., filed Apr. 22, 2022 and issued Sep. 13, 2022, is directed to systems and methods for offering and purchasing tokenized securities on a blockchain platform meeting current and future federal, state, and offering and holding entity rules and regulations. Tokenized securities purchased during or after the tokenized securities offering are tradable on a secondary market. The server computer of the tokenized securities provides an automated transfer capability for tokenized securities holders.

U.S. Pat. No. 11,216,802 for Self-enforcing security token implementing smart-contract-based compliance rules consulting smart-contract-based global registry of investors by inventors Overholser, et al., filed Aug. 9, 2019 and issued Jan. 4, 2022 is directed to a network node that includes at least one processor, at least one memory, and at least one network interface is disclosed. The network node is part of a peer-to-peer network of network nodes implementing a distributed ledger. The network node is communicatively coupled to at least one remotely located computing device through the at least one network interface. The at least one processor is configured to receive, from a remotely located computing device, a request to transfer a security token. The at least one processor is also configured to execute a plurality of compliance rules associated with the security token. At least one of the compliance rules is implemented using at least one smart contract. The at least one smart contract references a global registry. The at least one processor is also configured to transfer the security token based on the execution of the compliance rules.

U.S. Pat. No. 11,057,353 for Systems, methods, and devices for implementing a smart contract on a distributed ledger technology platform by inventors Smith, et al., filed Oct. 9, 2019 and issued Jul. 6, 2021 is directed to implementations of one or more smart contracts deployed on a distributed ledger technology (DLT) platform. Implementation of one or more specific smart contracts and/or private data sharing technologies on a DLT platform can provide frameworks and/or solutions to generate a smart UCC platform that facilitates submission and tracking of Uniform Commercial Code (UCC) filings on a distributed ledger or blockchain platform. Implementation of one or more specific smart contracts and/or private data sharing technologies on a DLT platform can provide frameworks and/or solutions to generate a smart company platform for controlling, managing, and/or communicating company documents and/or communications on a distributed ledger or blockchain platform.

U.S. Patent Publication No. 2021/0377225 for Systems, methods, and devices for implementing a smart contract on a distributed ledger technology platform by inventors Smith, et al., filed May 13, 2021 and published Dec. 2, 2021 is directed to implementations of one or more smart contracts deployed on a distributed ledger technology (DLT) platform. Implementation of one or more specific smart contracts and/or private data sharing technologies on a DLT platform can provide frameworks and/or solutions to generate a smart UCC platform that facilitates submission and tracking of Uniform Commercial Code (UCC) filings on a distributed ledger or blockchain platform. Implementation of one or more specific smart contracts and/or private data sharing technologies on a DLT platform can provide frameworks and/or solutions to generate a smart company platform for controlling, managing, and/or communicating company documents and/or communications on a distributed ledger or blockchain platform.

U.S. Pat. No. 11,017,405 for Blockchain compliance platform and system for regulated transactions by inventors Borzilleri, et al., filed Dec. 31, 2018 and issued May 25, 2021 is directed to regulated crypto-assets, or blockchain tokens, that are regulated as securities (security tokens), which can be purchased using a compliance platform through a compliance wallet that allows token purchasers and token sellers to purchase and sell security tokens in a regulatory compliant manner. A rules engine of the compliance platform determines what compliance rules need to be satisfied for a given transaction and guides the token purchasers through a compliance process. Token sellers, upon being presented with a request to purchase tokens on the blockchain, can verify approved transactions on the compliance platform to ensure that the transaction can be compliantly processed.

United Kingdom Patent Publication No. 2,517,127 for Method for deriving a verification token from a credential by inventors Camenisch, et al., filed May 29, 2013 and published Jul. 10, 2013 is directed to a verification token that is derived from a credential that comprises a set of attributes certified by an issuer to a user by means of a public key of the issuer. The token is generated from the credential so as to comprise at least one commitment to an attribute a commitment being a blinded version of the attribute preferably using an anonymous credential scheme. An opening key for the token is generated to enable the validity of the attribute to be confirmed. The token is bound to a context string, e.g. a nonce number and/or a public key of the verifier system, to prevent its reuse with a different context string. One or more attributes, a verification token and opening keys may be transferred to a verifier system so that the verifier can confirm the validity of the attributes based on the token, the opening keys and the public key of the credentials issuer. Similarly, a subset of the attributes may be may be transferred by the verifier to an auditor system to confirm the validity of the subset of attributes.

U.S. Pat. No. 9,871,655 for Method for deriving a verification token from a credential by inventors Camenisch, et al., filed Jan. 10, 2017 and issued Jan. 16, 2018 is directed to a method for deriving a verification token from a credential may be provided. The credential may be a set of attributes certified by an issuer to a user using a public key of the issuer. The method may comprise generating the verification token out of the credential and binding the verification token to a context string, wherein the verification token may comprise at least one commitment. A commitment may be a blinded version of an attribute. The method may also comprise generating an opening key for the verification token enabling a generation of a confirmation for a validity of the attribute.

European Patent No. 3,073,670 for a system and a method for personal identification and verification by inventors Andrade, et al., filed Mar. 27, 2015 and issued Sep. 2, 2020 is directed to a personal identity-linked credential authentication protocol that can be adopted or modified by the central banks or other financial institutions, in order to issue their own digital currencies that are supported by a distributed ledger payment system, but also regulated by a central governing body. Wherein such digital currencies can hence inherit advantages of the existing banking system and advantages of cryptography-based electronic money.

U.S. Patent Publication No. 2020/0175501 for methods and apparatus for value transfer by inventor Vange, filed Aug. 24, 2018 and published Jun. 14, 2020 is directed to various modules for facilitating a controlled exchange environment for tokens residing on one or more distributed ledgers. The modules are configured to create and issue tokens on one or more distributed ledgers and verify that a wallet of a recipient or other entity is qualified to receive the token before allowing the transfer of the token into the wallet. The modules may also restrict access to the token until one or more predetermined events take place.

U.S. Pat. No. 11,522,700 for systems, methods, and program products for depositing, holding and/or distributing collateral as a token in the form of digital assets on an underlying blockchain by inventors Auerbach, et al., filed Feb. 22, 2019 and issued Dec. 6, 2022 is directed to a method, system, and program product for depositing, holding and/or distributing collateral in the form of a stable value token for a security token, the tokens being on the same underlying blockchain. Furthermore, to methods, systems, and program products for lending digital assets, such as crypto currency and other related products.

U.S. Pat. No. 11,509,464 for system and method using a fitness-gradient blockchain consensus and providing advanced distributed ledger capabilities via specialized data records by inventor Gutierrez-Sheris, filed Jun. 15, 2020 and issued Nov. 22, 2022 is directed to an improved system that implements Fitness Gradient Consensus including hash distance and bucket consensus variations within a digital blockchain by calculating the highest fitness value among competing blocks to resolve conflicts and allocate the rewards associated with building new blocks. The consensus system applies conflict resolution formulas to incentivize block-building nodes to share blocks generated, as it completes construction, to improve chances of a reward, resulting in enhanced speed and security of blockchain. The hash distance consensus utilizes a hash distance scalar value as part of its fitness metric, and the bucket consensus assigns tokens to buckets and calculates an aggregate value of the assigned tokens. A trust-but-verify variant increases transactional throughput and reduces linearity and computational constraints. The system also utilizes novel record types, such as token genesis, transfer, transaction, trade order, settlement, proposition, determination, and pattern linkage records to facilitate the automation of financial, commercial and legal processes.

U.S. Pat. No. 11,361,289 for distributed cryptographic tokens with downstream administrative control by inventors Housser, et al., filed Feb. 27, 2019 and issued Jun. 14, 2022 is directed to a platform that enables centralized control over updates to a distributed cryptocurrency network through inclusion of an administrative user to a set of tokens that operate on a base cryptocurrency network but include rule sets that are separate from those of the base cryptocurrency. A plurality of customized token types are generated by a platform provider for respective administrative users. The platform provider may provide software updates that are implemented at the sole discretion of the respective administrative users.

U.S. Pat. No. 10,699,340 for blockchain instrument for transferable equity by inventors Gordon, et al., filed Jul. 22, 2019 and issued Jun. 30, 2020 is directed to systems and methods for offering and purchasing tokenized securities on a blockchain platform meeting current and future federal, state, and offering and holding entity rules and regulations. Tokenized securities purchased during or after the tokenized securities offering are tradable on a secondary market. The server computer of the tokenized securities provides an automated transfer capability for tokenized securities holders.

SUMMARY OF THE INVENTION

The present invention relates to a method, system, and apparatus for facilitating scalable compliance for transactions of tokenized assets.

It is an object of this invention to provide a method for creating compliance aware tokens of value assets.

In one embodiment, the present invention includes a system for enforcing a ruleset for a decentralized financial transaction including a compliance enhanced architecture in network communication with at least one server computer and at least one distributed ledger; wherein the compliance enhanced architecture includes a Policy Enforcement Point (PEP), a rules engine, at least one recipe, and an attribute source module; wherein the compliance enhanced architecture is operable to establish a link between at least one participant and at least one wallet on the at least one distributed ledger; wherein the at least one wallet corresponds to a unique address on the at least one distributed ledger; wherein the PEP is operable to receive a proposed transaction from the at least one wallet to transfer at least one digital token representing at least one asset; wherein the attribute source module is operable to determine at least one participant attribute attributable to the at least one participant, at least one token attribute attributable to the at least one digital token, and/or at least one transaction attribute attributable to the proposed transaction; wherein the at least one recipe is computer interpretable code of a compliance, regulatory, and/or other governance policy rule and/or ruleset; wherein the at least one recipe includes a Subject Verb Object (SVO) structure in which the at least one participant is assigned as a subject, the proposed transaction is assigned as a verb, and the at least one digital token is assigned as an object; wherein the rules engine is operable to determine a policy decision by comparing the at least one participant attribute, the at least one digital token attribute, and the at least one transaction attribute to the at least one recipe; wherein the PEP is operable to determine at least one right to perform the proposed transaction based on the policy decision; wherein the PEP is operable to permit or deny the proposed transaction based on the presence or absence of the at least one right; wherein compliance enhanced architecture further includes an interoperability layer and a decorator pattern; wherein the interoperability layer is operable to implement the PEP on the distributed ledger, off the distributed ledger, and/or partially on the distributed ledger and partially off the distributed ledger; and wherein the decorator pattern is operable to intercept at least one action across dissimilar networks distributed ledgers and execute compliance functions of the PEP across the dissimilar distributed ledgers.

In another embodiment, the present invention includes a system for enforcing a ruleset for a decentralized financial transaction including a compliance enhanced architecture in network communication with at least one server computer and at least one distributed ledger; wherein the compliance enhanced architecture includes a Policy Enforcement Point (PEP), a rules engine, at least one recipe, and an attribute source module; wherein the compliance enhanced architecture is operable to establish a link between at least one participant and at least one wallet on the at least one distributed ledger; wherein the at least one wallet corresponds to a unique address on the at least one distributed ledger; wherein the PEP is operable to receive a proposed transaction by the at least one wallet to transfer at least one digital token representing at least one asset; wherein the attribute source module is operable to determine at least one participant attribute attributable to the at least one participant, at least one token attribute attributable the at least one digital token, and/or at least one transaction attribute attributable to the proposed transaction; wherein the at least one recipe is computer interpretable code of a compliance, regulatory, and/or other governance policy rule and/or ruleset; wherein the at least one recipe includes a Subject Verb Object (SVO) structure in which the at least one participant is assigned as a subject, the proposed transaction is assigned as a verb, and the at least one digital token is assigned as an object; wherein the rules engine is operable to determine a policy decision by comparing the at least one participant attribute, the at least one digital token attribute, and the at least one transaction attribute to the at least one recipe; wherein the PEP is operable to determine at least one right to perform the proposed transaction based on the policy decision; wherein the PEP is operable to permit or deny the proposed transaction based on the presence or absence of the at least one right; wherein the PEP further includes a token factory; wherein the token factory is operable to deploy the at least one digital token with an existing token standard through at least one smart contract and extend the existing token standard to include compliance functions of the PEP; and wherein the token factory is operable to update and/or remove token standards over time.

In yet another embodiment, the present invention includes a system for enforcing a ruleset for a decentralized financial transaction including a compliance enhanced architecture in network communication with at least one server computer and at least one distributed ledger; wherein the compliance enhanced architecture includes a Policy Enforcement Point (PEP), a rules engine, at least one recipe, and an attribute source module; wherein the compliance enhanced architecture is operable to establish a link between at least one participant and at least one wallet on the at least one distributed ledger; wherein the compliance enhanced architecture is operable to identify a digital identity of the at least one participant and reverify the digital identity at predetermined times; wherein the at least one wallet corresponds to a unique address on the at least one distributed ledger; wherein the PEP is operable to receive a proposed transaction by the at least one wallet to transfer at least one digital token representing at least one asset; wherein the attribute source module is operable to determine at least one participant attribute attributable to the at least one participant, at least one token attribute attributable the at least one digital token, and/or at least one transaction attribute attributable to the proposed transaction; wherein the at least one recipe is computer interpretable code of a compliance, regulatory, and/or other governance policy rule and/or ruleset; wherein the at least one recipe includes a Subject Verb Object (SVO) structure in which the at least one participant is assigned as a subject, the proposed transaction is assigned as a verb, and the at least one digital token is assigned as an object; wherein the rules engine is operable to determine a policy decision by comparing the at least one participant attribute, the at least one digital token attribute, and the at least one transaction attribute to the at least one recipe; wherein the PEP is operable to determine at least one right to perform the proposed transaction based on the policy decision; and wherein the PEP is operable to permit or deny the proposed transaction based on the presence or absence of the at least one right.

These and other aspects of the present invention will become apparent to those skilled in the art after reading of the following description of the preferred embodiment when considered with the drawings, as they support the claimed invention.

BRIEF DESCRIPTION OF THE DRAWINGS

FIG. 4 illustrates a Graphical User Interface (GUI) of a regulatory recipe creation menu according to one embodiment.

DETAILED DESCRIPTION

Figure 1:
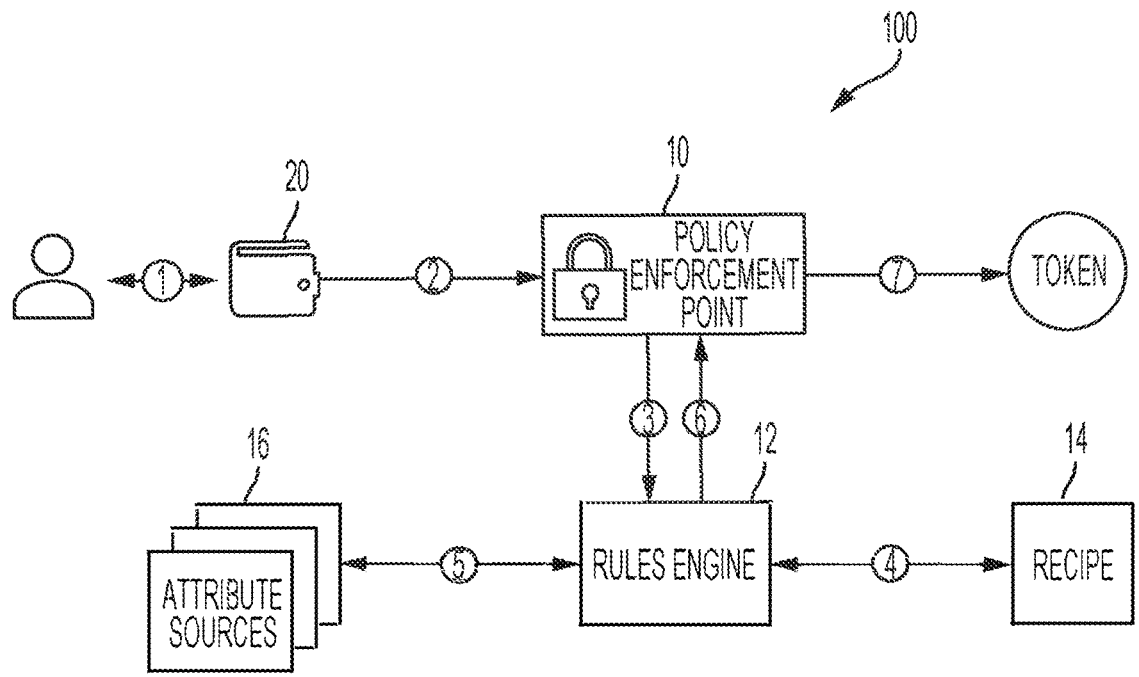
FIG. 1 illustrates an architecture and workflow diagram of a compliance enhanced architecture that extends Attribute Based Access Control (ABAC) process for object management according to one embodiment.

The present invention is generally directed to a method, system, and apparatus to facilitate scalable compliance of tokenized assets that results in compliance aware tokens that contain the rule or rulesets that the underlying token is subject to.

In one embodiment, the present invention includes a system for enforcing a ruleset for a decentralized financial transaction including a compliance enhanced architecture in network communication with at least one server computer and at least one distributed ledger; wherein the compliance enhanced architecture includes a Policy Enforcement Point (PEP), a rules engine, at least one recipe, and an attribute source module; wherein the compliance enhanced architecture is operable to establish a link between at least one participant and at least one wallet on the at least one distributed ledger; wherein the at least one wallet corresponds to a unique address on the at least one distributed ledger; wherein the PEP is operable to receive a proposed transaction from the at least one wallet to transfer at least one digital token representing at least one asset; wherein the attribute source module is operable to determine at least one participant attribute attributable to the at least one participant, at least one token attribute attributable to the at least one digital token, and/or at least one transaction attribute attributable to the proposed transaction; wherein the at least one recipe is computer interpretable code of a compliance, regulatory, and/or other governance policy rule and/or ruleset; wherein the at least one recipe includes a Subject Verb Object (SVO) structure in which the at least one participant is assigned as a subject, the proposed transaction is assigned as a verb, and the at least one digital token is assigned as an object; wherein the rules engine is operable to determine a policy decision by comparing the at least one participant attribute, the at least one digital token attribute, and the at least one transaction attribute to the at least one recipe; wherein the PEP is operable to determine at least one right to perform the proposed transaction based on the policy decision; wherein the PEP is operable to permit or deny the proposed transaction based on the presence or absence of the at least one right; wherein compliance enhanced architecture further includes an interoperability layer and a decorator pattern; wherein the interoperability layer is operable to implement the PEP on the distributed ledger, off the distributed ledger, and/or partially on the distributed ledger and partially off the distributed ledger; and wherein the decorator pattern is operable to intercept at least one action across dissimilar networks distributed ledgers and execute compliance functions of the PEP across the dissimilar distributed ledgers.

In another embodiment, the present invention includes a system for enforcing a ruleset for a decentralized financial transaction including a compliance enhanced architecture in network communication with at least one server computer and at least one distributed ledger; wherein the compliance enhanced architecture includes a Policy Enforcement Point (PEP), a rules engine, at least one recipe, and an attribute source module; wherein the compliance enhanced architecture is operable to establish a link between at least one participant and at least one wallet on the at least one distributed ledger; wherein the at least one wallet corresponds to a unique address on the at least one distributed ledger; wherein the PEP is operable to receive a proposed transaction by the at least one wallet to transfer at least one digital token representing at least one asset; wherein the attribute source module is operable to determine at least one participant attribute attributable to the at least one participant, at least one token attribute attributable the at least one digital token, and/or at least one transaction attribute attributable to the proposed transaction; wherein the at least one recipe is computer interpretable code of a compliance, regulatory, and/or other governance policy rule and/or ruleset; wherein the at least one recipe includes a Subject Verb Object (SVO) structure in which the at least one participant is assigned as a subject, the proposed transaction is assigned as a verb, and the at least one digital token is assigned as an object; wherein the rules engine is operable to determine a policy decision by comparing the at least one participant attribute, the at least one digital token attribute, and the at least one transaction attribute to the at least one recipe; wherein the PEP is operable to determine at least one right to perform the proposed transaction based on the policy decision; wherein the PEP is operable to permit or deny the proposed transaction based on the presence or absence of the at least one right; wherein the PEP further includes a token factory; wherein the token factory is operable to deploy the at least one digital token with an existing token standard through at least one smart contract and extend the existing token standard to include compliance functions of the PEP; and wherein the token factory is operable to update and/or remove token standards over time.

In yet another embodiment, the present invention includes a system for enforcing a ruleset for a decentralized financial transaction including a compliance enhanced architecture in network communication with at least one server computer and at least one distributed ledger; wherein the compliance enhanced architecture includes a Policy Enforcement Point (PEP), a rules engine, at least one recipe, and an attribute source module; wherein the compliance enhanced architecture is operable to establish a link between at least one participant and at least one wallet on the at least one distributed ledger; wherein the compliance enhanced architecture is operable to identify a digital identity of the at least one participant and reverify the digital identity at predetermined times; wherein the at least one wallet corresponds to a unique address on the at least one distributed ledger; wherein the PEP is operable to receive a proposed transaction by the at least one wallet to transfer at least one digital token representing at least one asset; wherein the attribute source module is operable to determine at least one participant attribute attributable to the at least one participant, at least one token attribute attributable the at least one digital token, and/or at least one transaction attribute attributable to the proposed transaction; wherein the at least one recipe is computer interpretable code of a compliance, regulatory, and/or other governance policy rule and/or ruleset; wherein the at least one recipe includes a Subject Verb Object (SVO) structure in which the at least one participant is assigned as a subject, the proposed transaction is assigned as a verb, and the at least one digital token is assigned as an object; wherein the rules engine is operable to determine a policy decision by comparing the at least one participant attribute, the at least one digital token attribute, and the at least one transaction attribute to the at least one recipe; wherein the PEP is operable to determine at least one right to perform the proposed transaction based on the policy decision; and wherein the PEP is operable to permit or deny the proposed transaction based on the presence or absence of the at least one right.

In one embodiment, the invention includes a method executed by at least one computing device for governing tokenized financial transactions on a distributed ledger over a computer network, the method comprising: obtaining data indicative of a verified identity of at least one participant on a transaction; receiving participant attribute values for the at least one participant, the participant attributes being mapped to a wallet address indicating a category of investor associated with at least one of the at least one participants and a jurisdiction applicable to the at least one participant as well as other participant attributes relevant to assessing the compliance of the transaction; receiving a request to engage in transaction of a token from a requesting participant that is one of the at least one participants, the token having token attribute values describing an underlying asset, the request including an indication of the token, and the participant attributes of the requesting participant; identifying a policy to be enforced for the transaction and at least one rule associated with the policy, the at least one rule including a participant attribute, a comparison operator, and a desired value of the participant attribute and the at least one rule including a token attribute, a comparison operator, and a desired value of the token attribute; retrieving rights associated with the requested transaction based on the rule, the participant attribute value and the token attribute value, the rights specifying a verb/object pair; determining if the rights permit the requesting participant to engage in the transaction; allowing the transaction when the rights permit the transaction; and recording information indicating the transaction on a distributed ledger.

In one embodiment, the present invention includes a system for governing tokenized financial transactions on a distributed ledger over a computer network, the system comprising at least one computer processor and at least one memory having instructions stored therein which, when executed by the at least one computer processor, cause the at least one computer processor to: obtain data indicative of a verified identity of at least one participant on a transaction; receive participant attribute values for the at least one participant, the participant attributes being mapped to a wallet address indicating, among other things, a category of investor associated with at least one of the at least one participants and a jurisdiction applicable to the at least one participant; receive a request to engage in transaction of a token from a requesting participant that is one of the at least one participants, the token having token attribute values describing an underlying asset, the request including an indication of the token, and the participant attributes of the requesting participant; identify a policy to be enforced for the transaction and at least one rule associated with the policy, the at least one rule including a participant attribute, a comparison operator, and a desired value of the participant attribute and the at least one rule including a token attribute, a comparison operator, and a desired value of the token attribute; retrieve rights associated with the requested transaction based on the rule, the participant attribute value and the token attribute value, the rights specifying a verb/object pair; determine if the rights permit the requesting participant to engage in the transaction; allow the transaction when the rights permit the transaction; and record information indicating the right to perform a transaction on a distributed ledger.

In one embodiment, the invention includes a non-transient computer readable medium storing instructions therein which, when executed by at least one computer processor, cause the at least one computer processor to: obtain data indicative of a verified identity of at least one participant on a transaction; receive participant attribute values for the at least one participant, the participant attributes being mapped to a wallet address indicating, among other things, a category of investor associated with at least one of the at least one participants and a jurisdiction applicable to the at least one participant; receive a request to engage in transaction of a token from a requesting participant that is one of the at least one participants, the token having token attribute values describing an underlying asset, the request including an indication of the token, and the participant attributes of the requesting participant; identify a policy to be enforced for the transaction and at least one rule associated with the policy, the at least one rule including a participant attribute, a comparison operator, and a desired value of the participant attribute and the at least one rule including a token attribute, a comparison operator, and a desired value of the token attribute; retrieve rights associated with the requested transaction based on the rule, the participant attribute value and the token attribute value, the rights specifying a verb/object pair; determine if the rights permit the requesting participant to engage in the transaction; allow the transaction when the rights permit the transaction; and record information indicating the right to perform a transaction on a distributed ledger.

None of the prior art discloses the creation of recipes representative of a wide variety of regulatory and policy rulesets, caching those recipes for efficient enforcement, applying the recipes to participant and transaction attributes, separating attribute verification and policy enforcement, and/or cross-ledger enforcement across dissimilar ledgers.

Digital currency (sometimes referred to as "digital money," "electronic money" or "electronic currency") is a type of currency available in digital form (in contrast to physical, such as banknotes and coins). Digital currency can either be centralized, where there is a central point of control over the money supply, or decentralized, where the control over the money supply can come from various sources. For example, cryptocurrency is a digital asset designed to work as a medium of exchange that uses cryptography to secure financial transactions, control the creation of additional units, and verify the transfer of assets.

Cryptocurrencies can use decentralized control without the need for central banking systems or other trusted centralized parties. The decentralized control can be accomplished through distributed ledger technology (DLT), such as a blockchain, that serves as a shared financial transaction database. In a blockchain, transactions can be recorded as "blocks" of data stored in a linear chain. Each block in the chain contains transaction data and is cryptographically hashed. The blocks can include a hash of the previous-block in the chain. This makes it computationally difficult, virtually impossible, to change data in one block because it would also require changing all subsequent blocks in the chain. This ensures that all data in the overall blockchain has not been tampered with and remains unchanged.

A consensus mechanism is used to authenticate the transactions and record the blocks. Parties conduct transactions through "wallets" which have a unique address and store the public and private keys which can be used to receive or spend a cryptocurrency. The cryptocurrency itself is not in the wallet. Every piece of cryptocurrency has a private key. Wallets hold the private key(s). With the private key, it is possible to digitally sign a transaction and write it in the public ledger, effectively spending the associated cryptocurrency. The chain is stored on multiple devices in a peer-to-peer network. The data stored in blocks can include automatically executable code known as a "smart contract." Smart contracts are computer protocols that facilitate, verify, or enforce the performance of an agreement.

Cryptocurrencies can be thought of as tokens that have a limited supply and in which ownership is recorded on the ledger. Therefore, cryptocurrencies can be used to "tokenize", i.e. represent, an underlying security, such as an equity interest in an underlying asset. For example, it is known to tokenize various assets, such as real estate and financial instruments, and trade the tokens. Since 2014, efforts to tokenize asset value on distributed ledger technologies have been gaining attention.

However, many tradeable financial assets, and thus any token representing the same, are considered to be "securities" under the regulatory framework of various countries. For example, the US Securities and Exchange Commission (SEC) promulgates and enforces regulatory restrictions on how securities can be sold, who they can be sold to, records that must be kept, and disclosures that must be made. Various other countries have their own laws and regulations governing the sale of securities creating a complex web of regulatory requirements for the sale of securities. Recently, it has become very common to utilize Initial Coin Offerings (ICO) as a mechanism for funding a business based on the sale of cryptocurrency tokens. Such tokens are often deemed to be "securities" under US law and the law of other jurisdictions and thus are subject to the relevant securities laws.

The broad acceptance of digital currency has been stunted by a lack of concern for, or the inability to comply with, the laws and regulations of various jurisdictions. For example, many ICOs were conducted without concern for regulatory compliance and are now being investigated by the SEC or other agencies. Many parties are trying to restrict sales of tokenized assets to jurisdictions that they believe have a regulatory framework that allows such sales. However, the inherent distributed nature of DLT makes it virtually impossible to restrict the jurisdiction of a token sale. Further, governmental entities with potential jurisdiction of the token include the applicable governmental entities having jurisdiction of the original token issuer, the token seller, the token purchaser, the venue for token exchange, and any locations in which the token passes or is stored. The result is that many parties have avoided the sale of tokenized assets entirely to avoid the expense and complexity of regulatory compliance.

It can be seen that securities offerings, from private placements to public offerings, have a wide range of reporting requirements and distribution limitations. There are also a range of tax implications and transfer restrictions associated with securities transactions. While blockchain solutions provide the promise of liquidity by facilitating frequent transactions between investors, this promise cannot be realized without real time enforcement of regulatory compliance. Fully realizing liquidity in token-based securities transactions will require an extensive, yet flexible, compliance framework.

In one embodiment, the present invention is directed to an architecture and protocol that allows known practices in Digital Rights Management (DRM) and Attribute Based Access Control (ABAC) to be leveraged and extended through blockchain smart contracts and compliance workflows to create tokens that incorporate regulatory and other governance requirements implicitly. Implementations disclosed herein facilitate the efficient, compliant transfer of any form of value globally.

As noted above, laws governing the behavior of securities vary from jurisdiction to jurisdiction. A central benefit of distributed ledger technologies is the efficient transfer of value globally. Maximizing this benefit in a securities context requires a compliance framework to control token distribution by identifying and qualifying participants globally, codifying widely varying securities laws from global jurisdictions, and enforcing these rules in all contexts and for any transaction. Technical mechanisms to govern token transactions are referred to herein as "distribution controls." Throughout a security's existence, its transactions incur regulatory oversight. These transactions often have tax implications, require restrictions to protect and qualify investors, demand analysis and reporting to mitigate fraud, and impose requirements designed to restrict money laundering. Since tokenized value can be transferred or traded via decentralized wallets, distribution controls should "travel with" the token and be built into DLTs via smart contracts or other ledger controls. In information technology (IT) parlance, the distribution controls should be "persistent," i.e., be maintained despite transfer from one ledger to another.

When token ownership is represented on the token's native ledger, token ownership is said to be "on ledger." In many cases, the ownership of token value may be derived from the native ledger value and represented in a different ledger (often an internal database) for efficient handling and custody. Many exchanges and custody solutions use this technique for speed, efficiency, and security. In these cases, the transfer of ownership of the token's value is said to be "off ledger". Since many or all of the same distribution restrictions apply "off ledger", distribution controls should also function in these scenarios and should not be limited exclusively to "on ledger" uses.

To mitigate risk of any systemic weakness of a particular DLT and to ensure securities tokens can leverage innovation in DLTs, distribution controls should be independent of any specific distributed ledger and should be portable across ledger implementations. For example, the disposition of a U.S. real property interest by a foreign person (the transferor) is subject to the Foreign Investment in Real Property Tax Act of 1980 (FIRPTA) income tax withholding; FIRPTA authorized the United States to tax foreign persons on dispositions of U.S. real property interests. Additionally, in some jurisdictions, including the federal laws of the United States, the number of holders of a class of securities is significant. For example, under Section 12(g) of the Securities Act of 1934), if a class of equity securities is held by more than 2000 holders, the issuer of the security becomes obligated to extensive reporting obligations; colloquially, this is known as being a "public company". In the absence of adequate distribution controls, these situations could inadvertently arise resulting in undesirable consequences for the issuer.

Many securities transactions are legally permissible under federal, state or non-U.S. laws or regulations only if the participants meet certain criteria, such as being an "accredited investor", "qualified investor", or the like, or meet certain geographic or residency criteria. In many cases, such as the accreditation status of an investor, these qualities are dynamic rather than static. Since the validity of a transaction depends on changing conditions, the rules enforcement model must be both real time and scalable.

Blockchain networks (or "networks") can be global by design and facilitate the rapid transfer of ownership anywhere in the world. But, as noted above, securities laws can vary dramatically from jurisdiction to jurisdiction. For example, investor qualification, reporting requirements, and even the legality of security token offerings as a capital formation method vary across international jurisdictions. Therefore, securities tokenization requires a compliance framework that can: recognize the jurisdiction of the offering and all participants involved in a transaction; account for complex, even conflicting regulatory requirements in both primary markets and subsequent trade and transfer; incorporate patchwork regulations into rulesets that can be enforced automatically and at scale; and adapt to changes in regulatory restrictions throughout the token's lifecycle.

For many securities, additional restrictions on transactions (beyond regulatory limits) may be required. Restrictions defined by the issuer are common in contracts and practice. Examples include the ability to require explicit issuer permission for transfer, controls on the minimum or maximum size of holdings for participants, bounds on trading price, and more. Restrictions may depend on context such as market conditions, number of participants, participant role within the company, proximity to corporate announcements or actions, etc. The complexity of these rules requires a flexible yet extensive rights management model.

To protect investors, limit fraud, and enable proper government oversight, securities tokens must be handled in a manner consistent with regulations, must be held only by authorized persons, and must comply with proper reporting requirements. The distribution controls are not limited to implementations solely to tokenized securities, rather they are operable to be implemented to the transfer of other tokenized assets. Many governmental authorities require the reporting of large financial transactions. For example, in the United States, the Bank Secrecy Act currently requires financial institutions to report cash transactions exceeding a daily aggregate amount of $10,000 (US) in value or transactions which are otherwise suspicious. In order to comply with such regulations, service providers must ensure they know the identity of both parties to the transaction.

Therefore, there is a need for global scale compliance via a self-enforcing, self-reporting financial services infrastructure that is compliant with the real-time distributed nature of cryptocurrencies. Applicant has discovered that the transparency, immutability, and decentralization of execution logic offered by distributed ledgers can be leveraged to provide the basis for such an infrastructure. These advances provide the means to reduce the cost and latency of complex securities transactions. Through proper implementation of blockchain ledger-based policy enforcement, there exists an opportunity to revolutionize banking and other financial services for the first time since the Medici ledger innovations of the 15th century which provided the liquidity that fueled the Renaissance.

In one embodiment, the invention includes a computer architecture, platform, and process to govern the compliance and suitability of decentralized financial transactions preferably for tokenized securities. While securities transactions are among the most complex financial transactions, the implementations of the present invention are not limited by this application and is operable to govern other transactions such as utility token transfers and fiat payments.

In one embodiment, the invention includes a rules engine that maps complex securities laws and transaction controls into verifiable rulesets that can be evaluated in a centralized or decentralized fashion. These rulesets can be saved as "recipes," reusable data structures of a compliance or other governance decision-making, that can be easily shared, edited graphically, and stored on non-transient media in an open standard format such as eXtensible Access Control Markup Language (XACML) or other computer interpretable code. In one embodiment, a recipe includes rules and regulations from the Securities and Exchange Commission (SEC) and/or other major securities laws.

In one embodiment, the invention transforms illiquid financial instruments, for which transfer is impractical due to the complexity and lack of repeatability in compliance decisions, into highly liquid instruments that can be used in everyday transactions of any size. While the revolution in DLTs is likely to transform the nature of many transactions, many transactions will continue to occur "off chain" in systems and venues that use other techniques such as conventional databases, spreadsheets, or other electronic means to maintain a record of transactions. To account for this, the implementations employ techniques to govern transactions on chain (governing transactions within a DLT), across chains (providing controls on different DLTs), and off chain (governing transactions that occur in traditional ledgers or between ledgers).

In one embodiment, the invention includes a combination of compliance workflows, attribute verification tools, a scalable key/lock model for enforcement, smart contracts and/or other ledger controls to provide a decentralized Attribute Based Access Control (ABAC) framework to govern global financial tokenized transactions without the need for an active intermediary. Through ABAC, abstractions of smart contracts, and the sharing of recipes, implementations provide methods to govern on chain and off chain transactions.

In a traditional ABAC model, users' access to objects, such as documents and data, in an enterprise is governed by a policy enforcement point (PEP). The user makes an electronic request for access to an object. The PEP consults with a policy decision service (PDS) which in turn gathers the appropriate policy (i.e., the regulation, compliance, rule, ruleset, or policy that a proposed transaction is subject to) and attribute data (i.e., the characteristics surrounds a proposed action, a participant, and/or a token subject to the action) to provide a decision on access (i.e., whether the proposed action is in compliance with the applicable policy). If granted, the user is provided access to the object.

Referring now to the drawings in general, the illustrations are for the purpose of describing one or more preferred embodiments of the invention and are not intended to limit the invention thereto.

FIG. 1 illustrates a compliance enhanced architecture 100 that leverages ABAC components. In one embodiment, the compliance enhanced architecture 100 includes at least one wallet 20, a policy enforcement point (PEP) 10, a rules engine 12, at least one recipe 14, and an attribute source module 16. In one embodiment, the compliance enhanced architecture 100 is operable to establish a link between a participant's identity and a unique address, represented by wallet 20, on a distributed ledger. In one embodiment, the PEP 10 is operable to govern tokenized asset transactions between users (or "participants") in an enterprise, blockchain, network, and/or other domain. In one embodiment, the rules engine 12 includes a policy decision service (PDS). In one embodiment, the rules engine 12 is operable to gather an applicable policy and access rights data for a tokenized asset. In one embodiment, the at least one recipe 14 defines and compiles the rules required to be satisfied in order to perform a compliant enterprise action (i.e., a transaction). In one embodiment, the recipe 14 includes a policy store. In one embodiment, the attribute source module 16 provides contextual data related to transaction participants, affected tokens, and/or the environment to support a policy decision.

Advantageously, the compliance enhanced architecture 100 is operable to: 1) establish a link between a user's identity and a wallet 20 on a distributed ledger while providing a scalable decision making, deterministic decision making, and while protecting the user's privacy; 2) extend the concept of governance of access (a single verb) to "token rights" which include verb/object pairs; 3) provide sharable recipes of regulatory laws, securities laws, regulatory compliance, and/or other policy enforcement rules ("recipes"); 4) provide sharable recipes of context attributes; 5) enforce the sharable recipes through ledger controls and/or smart contracts; and 6) map policies to tokenized assets.

In one embodiment, the compliance enhanced architecture 100 includes a process for governing decentralized financial transactions, which is represented by the arrows and circled numbers of FIG. 1. In one embodiment and at step 1, the digital identities of participants in a financial transaction are identified. In one embodiment, the digital identities of participants to a financial transaction are identified utilizes a scalable Identity Proofing (IdP) model that operates at global scale. In one embodiment, access to the digital identity of participants in a financial transaction and the participants' affiliated rights is controlled by distributed identity services. In one embodiment, the distributed identity services provide secure risk-based authentication using multiple factors including biometrics. Advantageously, the distributed identity service provides flexible, high assurance access to a user's rights on financial networks. In one embodiment, participants are associated with wallet addresses. In one embodiment, the compliance enhanced architecture 100 is operable to reverify the identity and relevant attributes of the owner of a cryptographic wallet 200. In one embodiment, the reverification is performed frequently and at any time to prevent identity theft and/or fraudulent sharing of rights to subvert securities laws. In one embodiment, relevant attributes about the participating identities are verified for all participants in governed transactions. In this embodiment, this verification involves risk decisions governed by compliance policies of the party responsible governing token transactions (usually the issuer and/or broker-dealer). In one embodiment, aspects of verification steps are automated using techniques the applicant has implemented. In one embodiment, aspects of verification steps are judgement calls that require longer running workflows or processes.

In one embodiment, once participant Identification (ID) has been verified, participant attributes are determined through known "know your customer" (KYC) processes or other similar method known in the art. In one embodiment, participant attributes include information necessary for the KYC process, such as, the participants name, complete address, PIN code, Permanent Account Number (PAN), mobile number, email address, income details or ranges, details of custodians, social security number (SSN), and/or other KYC attributes. In one embodiment, the participant ID is used in decentralized policy enforcement. Advantageously, by separating attribute verification processes (often slow and subjective) from policy enforcement (nearly instant and objective), compliance enforcement can be performed in real time globally on decentralized networks. In one embodiment, verified participant attributes are linked to a unique address, e.g. cryptographic or digital wallets 20, on the network or ledger. In one embodiment, each wallet 20 corresponds to an address on a distributed ledger. In one embodiment, the authority to operate a wallet 20 is assessed using rights derived from the participant attributes of the owner of the wallet via the Policy Enforcement Point (PEP) 10. In one embodiment, participant attribute sets (i.e., a plurality of participant attributes associated with a single participant or user) are directly linked on a one-to-one basis to the entity owning and responsible for actions of the wallet 20. In one embodiment, all transactions performed via an address (wallet) are attributable to its owner and are associated with its owner's rights. Advantageously, because the address owner's participant attributes (and derived rights) are stored and assessed separate from the address owner's personal identifiable information (PII), the privacy of transaction participants is protected while ensuring that the transaction is attributable and compliant.

With reference to FIG. 1, at step 2, and in one embodiment, where a wallet 20 associated with an address makes a request to engage in a transaction (e.g., payment, transfer, purchase, trade, etc.) involving one or more tokens (i.e., a tokenized asset), PEP 10 is consulted to determine if the proposed transaction is in compliance with an applicable rule/regulation (i.e., a recipe 14). In one embodiment, the PEP 10 is implemented onto a distributed ledger through at least one smart contract. In one embodiment, the PEP 10 is implemented onto a distributed ledger through ledger controls. In one embodiment, the PEP 10 is operable to provide federated rights assessments off ledger through SAML (Security Assertion Markup Language) or other computer syntax known in the art.

With reference to FIG. 1, at step 3, in one embodiment, the compliance enhanced architecture 100 is operable to enforce a regulation, compliance, and/or any other asset based or currency-based policy for a given transfer or other action. In one embodiment, the PEP 10 queries rules engine 12. In one embodiment, the PEP 10 is operable to work in tandem with the rules engine 12 to enforce regulations, compliance, and/or any other asset-based or currency-based policy. Advantageously, the rules engine 12 is operable to provide a scalable and deterministic way to interpret policy and gather data from a wide range of services to provide timely decision-making for a given transaction context (including user identities, locations, token attributes and other variables). As a nonlimiting example, a token represents a share ownership of a US Regulation D security. As a result, token's distribution is limited to individuals who are accredited investors. A recipe 14, which limits distribution of the token to wallets of accredited investor, is attached to the token. In this example the PEP 10 obtains the attributes of all participants in the transaction, and evaluates them against the policy related to the specific token transfers.

In one embodiment, with reference to FIG. 1, in step 4, rules engine 12 gathers the appropriate and/or relevant policy associated with the desired right (i.e., that ability to complete a proposed transaction that is in compliance with an applicable ruleset) specified in the transaction request. In one embodiment, regulations, compliance rules, and/or other policies related a desired action or transaction are stored as "recipes." In one embodiment, the recipe 14 is created manually using the GUI of FIG. 4. In one embodiment, the recipe 14 is created automatically using natural language processing (NLP). In one embodiment, the rules engine 12 is operable to conduct NPL on a rule or ruleset to automatically create a recipe 14. In one embodiment, recipes are combined, reused and/or extended to leverage precedent, map complex and varied global regulations, and simplify regulatory oversight. In one embodiment, the rules engine 12 caches recipes 14 to facilitate rapid decisions for frequently used objects and/or actions. In one embodiment, the rules engine 12 is configured to set specific caching rules that results in certain specific recipes 14 being cached automatically based on predetermined factors. In one embodiment, the rules engine 12 is operable to cache a recipe 14 utilizing a function that balances the complexity of the ruleset to how dynamic the data applied to the ruleset is. In one embodiment, the rules engine 12 is operable to cache a recipe 14 that includes a highly complex ruleset and relatively unchanging data. In one embodiment, the rules engine 12 is operable to cache a recipe 14 that includes a low complexity ruleset and relatively highly dynamic data. In one embodiment, the rules engine's 12 caching function is operable to consider the underlying asset subject to the ruleset of the recipe 14 in determining whether to cache a recipe 14 or not. In one embodiment, the logic and functions of rules engine 12 is implemented on a distributed ledger, off a distributed ledger, or on a hybrid of on and off a distributed ledger through at least one smart contract for maximum flexibility, decentralization, and scale.

In one embodiment, with reference to FIG. 1, at step 5, the rules engine 12 is operable to consult the attribute source module 16 and gather relevant data on the transaction participants, objects, and environment. In one embodiment, rules engine 12 provides attributes, which contain descriptions where and how to obtain data needed for policy decisions in accordance with relevant recipe. As a nonlimiting example, if a policy related to a tokenized asset limits the number of token holders, the attribute in the rule contains a map with instructions on how to obtain the current number of token holders so that the rule can be evaluated. In one embodiment, the instructions include a network address of where the data (i.e., the relevant attribute) is stored, an Application Programming Interface (API) to access the data, and authorization information to access the data. In one embodiment, the rules engine 12 ensures flexibility by providing an interoperability framework and Graphical User Interface (GUI) to enable consultation with external, independent data sources referred to as "oracles". In this embodiment, data sources for rules assessment are mapped to the recipe 14.

In one embodiment, the rules engine 12 is operable to assess the regulations, compliance, policies, and/or other relevant rules from the recipe 14 to the characteristics surround a proposed tokenized asset transfer from the attribute source module 16. In one embodiment, the rules engine 12 is operable to determine whether the transfer characteristics and/or other attributes of the attribute source module 16 are compliant with the policies from the recipe 14. Advantageously, the rules engine 14 is operable to determine whether a proposed transaction is in regulatory compliance or not in regulatory compliance (hereafter referred to as "policy decisions"). In one embodiment, this is accomplished by the rules engine 12 by comparing data from the attribute sources module 16 with the rulesets from the recipe 14.

In one embodiment, with reference to FIG. 1, in step 6, policy decisions are returned from rules engine 12 to the PEP 10 for enforcement. In one embodiment, the policy decision indicates that a proposed transaction or action is not in regulatory compliance and the PEP 10 is operable to prevent, hinder, and/or stay the proposed transaction or action. In one embodiment, the policy decision indicates that a proposed transaction or action is in regulatory compliance and the PEP 10 is operable to allow, process, or otherwise not interfere with the proposed transaction or action. In one embodiment, rights to perform certain transactions (i.e., whether the tokenized asset transaction or action is in regulatory compliance) are cached at PEP 10 to facilitate efficient enforcement of recurring transactions. In one embodiment, the PEP 10 is operable to effectuate policy decisions in real time.

In one embodiment, with reference to FIG. 1, at step 7, the right to perform a transaction or action, which can include a verb/object pair, to perform the desired action on the object is granted, based on the appropriate recipe(s) and identities, and attributes, and the requested transaction is executed.

In one embodiment, the PEP 10 is operable to assess the regulatory or policy compliance for a proposed transaction or action by functionally communicating with the rules engine 12, which compares attribute data from the attribute source module 16 to the recipe 14. In effect, the regulatory compliance of a proposed transaction or action is determined, and the PEP 10 is functional as the final arbiter to determine such compliance. In one embodiment, with reference to FIG. 1, at step 7, the PEP 10 is operable to perform a proposed transaction or action on behalf of the user associated with the wallet 20. In one embodiment, the PEP 10 is operable to prevent a proposed transaction or action on behalf of a user associated with the wallet 20 from occurring.

Figure 2:
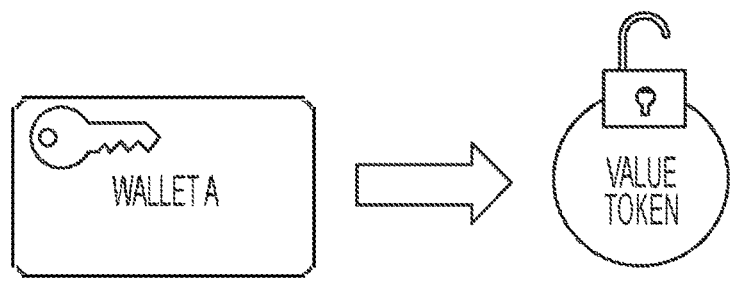
FIG. 2 illustrates a schematic diagram of wallet attributes and token attributes for use in policy enforcement for token governance according to one embodiment.

In one embodiment and with reference to FIG. 2, the token is signed by the user's wallet, using the address as a cryptographic key to derive a signature in a known manner, and the signature includes wallet attributes that indicate the relevant jurisdiction for the user and investor status of the user (e.g. accredited investor, institutional investor, etc.). Additionally, the token includes token attributes, i.e., associated metadata indicating other contextual attributes of the transaction. Governance of the transaction based on the token attributes and participant attributes is described in greater detail below.

Figure 3:
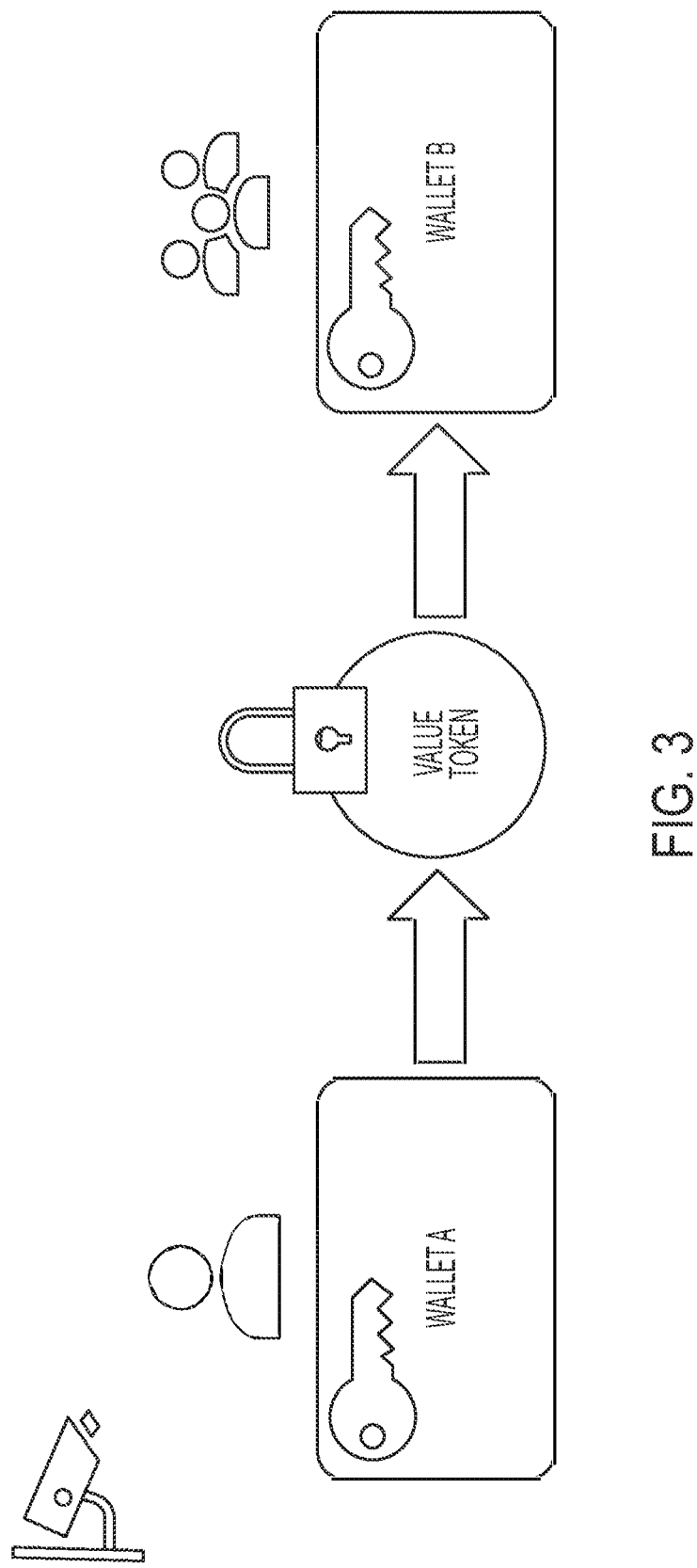
FIG. 3 illustrates a schematic diagram of a lock and key structure to govern transactions between wallets according to one embodiment.

In one embodiment and with reference to FIG. 3, the compliance enhanced architecture 100 is operable to utilize a key/lock structure. In one embodiment, the compliance enhanced architecture 100 isolates issuer judgment via the mapping of wallet attributes to repeatable and verifiable rule sets associated with the underlying value in a transaction (Lock). In one embodiment, verified attributes of the owner of wallet A, or wallet B, and environment variables such as the size of a transaction or the number of current participants is composed into a Key which are evaluated against the rulesets defined for the token or other object (Lock) to determine if participants in a transaction have the right to conduct the transaction. Advantageously, these rights are evaluated in real time in a decentralized fashion using a smart contract or other ledger controls to permit or block the transaction.

In one embodiment, the compliance enhanced architecture 100 is operable to utilize a key and lock structure. In one embodiment, the compliance enhanced architecture 100 is operable to isolate components to a transaction by mapping attributes or characteristics of a wallet 20 to repeatable and verifiable rules sets contained in the recipe 14. In this embodiment, the repeatable and verifiable rule sets contained in the recipe 14 act as the "lock". In this embodiment, the attributes or characteristics of a wallet 20, participant associated with a wallet, and the characteristics surrounding a proposed transaction or action act as the "key". In this embodiment, only the proper transaction or action characteristics are operable to "unlock" the key and allow the transaction to occur. In contrast, where the transaction or action characteristics do no align with the recipe, the transaction will not occur. In effect, the compliance enhanced architecture 100 is operable to determine if the characteristics surrounding a proposed transaction or action (i.e., characteristics of the wallet 20, characteristics of the user's associated with the wallet 20, characteristics of the proposed transaction, characteristics of the tokenized assets, etc.) are in compliance with the rules and regulations governing the tokenized asset.

In one embodiment, the compliance enhanced architecture 100 provide a flexible, repeatable, and scalable process to codify compliance rules associated with any financial transaction through a Subject Verb Object (SVO) structure. In one embodiment, the actor or actors attempting an action (i.e., the users or participants associated with a wallet 20) are the subject, the action being attempted (i.e., the transaction or action) is the verb, and the item on which the action is to be performed is the object (i.e., the specific token). To further illustrate, and as a nonlimiting example, a user (subject) is attempting to transfer (verb) a specific token (object). Advantageously, extending ABAC approaches in the way disclosed, (i.e., by converting access decisions to rights decisions) permits a more flexible framework for governing complex transactions on financial networks.

In one embodiment, the right to perform an action on an object, such as the transfer of a token, is evaluated by taking attributes associated with the subject (e.g., one or more transaction participants) and its context against a ruleset (recipe) that is assigned to the specific verb and object combination. Advantageously, the issuer can govern, for example, whether or not a user who does not have an attribute indicating accredited investor status can participate in a transaction involving a restricted access security token. In one embodiment, the transaction participants and environmental context (subject) provide the "key" while the desired action and token (verb/object) combination are associated with the "lock" to govern transactions.

Figure 4:
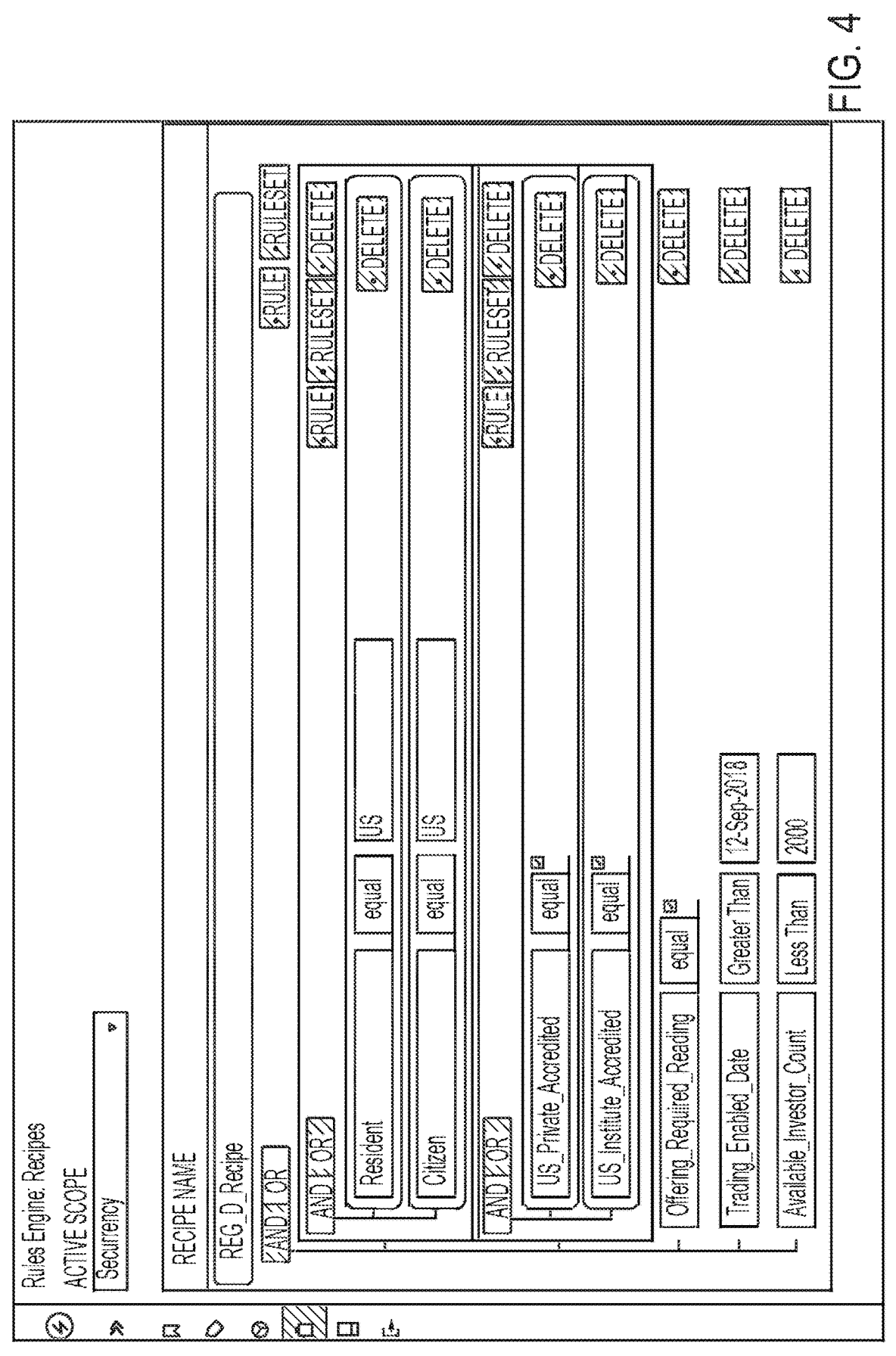

FIG. 4 illustrates a Graphical User Interface (GUI) of a regulatory recipe creation menu 400 according to one embodiment of the present invention. In one embodiment, the GUI of FIG. 4 is operable on a display device. In one embodiment, the recipe creation menu 400 is operable to provide options to create a recipe and/or edit an existing recipe. In one embodiment, user selection controls are provided for selecting attributes, values and logic for rules in a recipe.

In one embodiment, the recipe creation menu 400 is operable to create a recipe using a SVO structure. In one embodiment, the recipe 14 includes at least one rule and/or at least one ruleset. In one embodiment, the recipe 14 is assessed against information and/or data obtained from the attribute source module 16. In one embodiment, the PEP 10 is operable to assess the contents of at least one recipe 14 to that of the characteristics of at least one participant and at least one proposed action. The recipe 14 defines the right to perform an action on an object, i.e., the ability to make a transfer of a tokenized asset that is in compliance with a ruleset that the underlying asset is subject to. In one embodiment the creation menu 400 is operable to define a subject, a verb, and an object. In one embodiment, the subject is at least one participant to a transaction. In one embodiment, the verb is action of transferring a tokenized asset from one participant to another participant. In one embodiment, the object is a tokenized asset. Advantageously, by creating a recipe 14 in this way, the claimed invention is operable to assess whether the participant has the required status (as an example, an accredited investor) to participate in the transaction involving a tokenized asset with restricted access (as an example, a tokenized security).

In one embodiment, the recipe 14 includes fields for a residency of at least one participant, a citizenship of at least one participant, a private accreditation of at least one participant, an institute accreditation of at least one participant, whether a public offering is required, at least one trade enabling data, available investor count, and/or other similar fields relating to regulatory compliance of asset transfer. In one embodiment, the recipe 14 includes fields for at least one logical operator and at least one comparison operator. In one embodiment, the recipe 14 includes an equal to operator, a greater than operator, a less than operator, a greater than or equal to operator, a less than or equal to operator, a threshold operator, a soft threshold operator, a hard threshold operator, and/or a range operator.

In one embodiment, the rules engine 12 is configured to assess and implement a plurality of objects and concepts, such as, scopes, items, actions, transaction attributes, rules, recipes, and participant's rights. "Scopes" are shared parameters where multiple participants defines items, actions, and rights. In one embodiment, a scope includes the rules and required credentials to access and/or modify the scope. In one embodiment, the recipe 14 includes at least one scope. In one embodiment, tokenized assets are the "objects" against which rights (for example, transfer rights) are assessed. In one embodiment, within a scope, systems are free to create and maintain as many items (in the case of securities tokens these are the usually unique token symbols) as desired. In one embodiment, "Actions" are the verbs that can be performed on the items in the system (e.g. trade, transfer, etc). In one embodiment, "Attributes" are characteristic of the participants and their environment used in the evaluation of a ruleset.

In one embodiment, within a scope, attributes contain the name and mechanism to obtain data associated with the participant, item, and environment for real time evaluation of the rule set. As a nonlimiting example, a ruleset includes the requirement for participants in a transaction to be an accredited investor. Following this example, the attribute contains the description of where to obtain requirements for the participants in the context of the requested transaction and recovers the requirements for rule evaluation. In one embodiment, a rule contains an attribute, a comparison operator, and a desired value. As a nonlimiting example, a rule assesses a user's country of residence. Following this example, the rule requiring that the participant in the transaction cannot be a resident of the US is displayed akin to: Jurisdiction_Country (Attribute) IS NOT (Comparison Operator) United States (Desired Value).

In one embodiment, rules are composed and connected by rule operators (AND, OR, and fuzzy logic operators) using the GUI of FIG. 4. As a nonlimiting example, recipes are attached to object/verb combinations to define the attributes required to obtain rights required to conduct a transaction on the ledger network.

In one embodiment, rules engine 12 is located on a blockchain or distributed ledger ("on chain") through at least one smart contract. In one embodiment, rules engine 12 is off a blockchain or distributed ledger ("off chain"). Advantageously, the rules engine's 12 flexibility allows it to support scalable and/or decentralized rule evaluation. In one embodiment, the rules engine 12 is operable to evaluate at least one rule and/or ruleset off chain. In one embodiment, the rules engine 12 is operable to evaluate at least one rule and/or ruleset on chain. In one embodiment, the rules engine 12 is operable to evaluate at least one rule and/or ruleset at least partially on chain and at least partially off chain. In one embodiment, the rules engine 12 is operable to evaluate at least one rule to a ruleset on chain and evaluate at least one rule to a ruleset off chain. In one embodiment, the rules engine 12 is operable to be located off of a blockchain while evaluating information stored on the blockchain. As a nonlimiting example of a hybrid implementation, the rules engine 12 is located off of a blockchain while evaluating rights to a proposed transaction on a blockchain.

Figure 5:
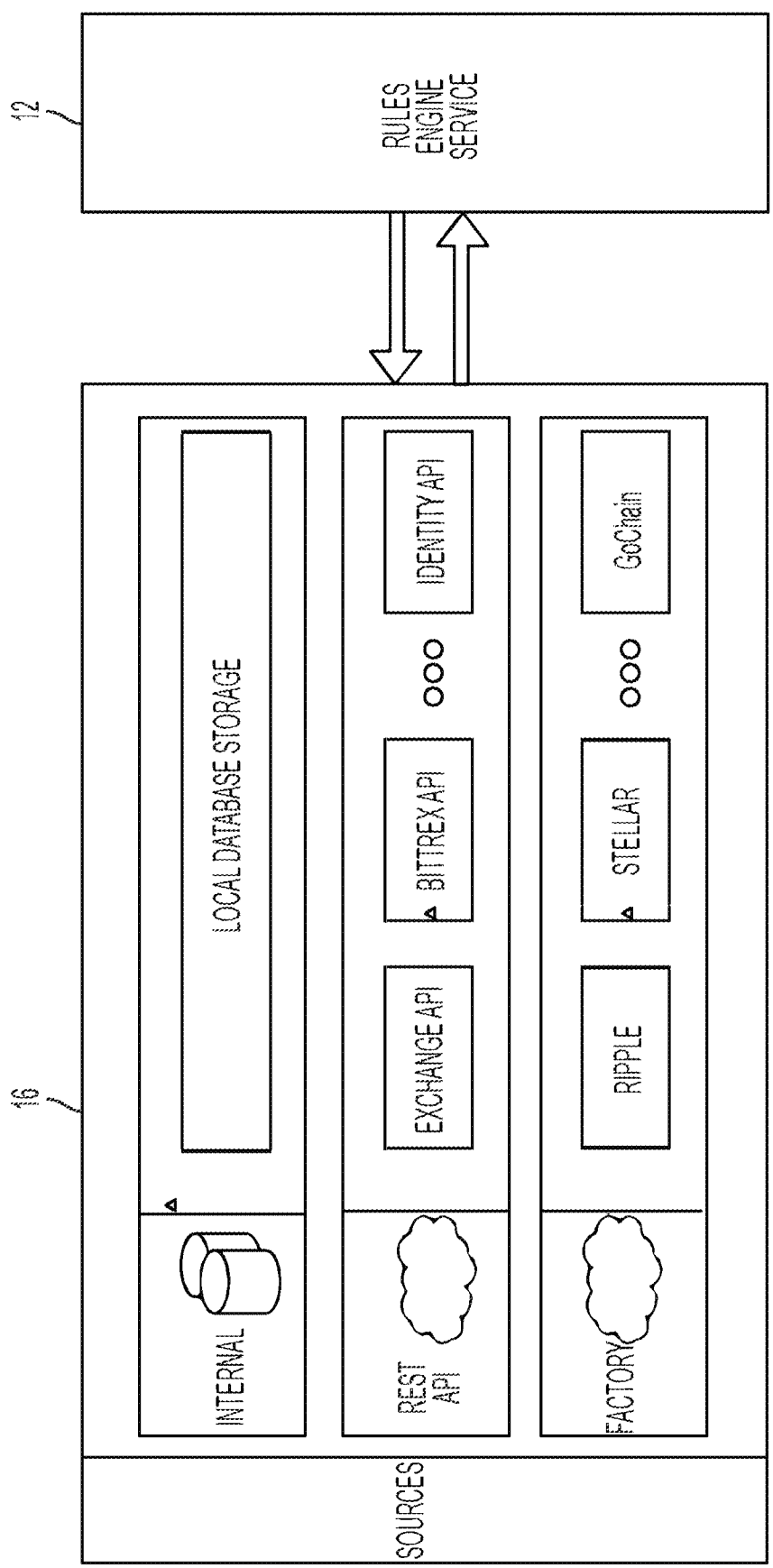
FIG. 5 illustrates a diagram of the flow of data from the attribute source module to the rules engine to facilitate policy decisions according to one embodiment.

FIG. 5 illustrates a diagram of the flow of data from the attribute source module 16 to the rules engine 12 to facilitate policy decisions, according to one embodiment. In one embodiment, the rules engine 12 is operable to acquire attribute data, required for a specific recipe 14, associated with a proposed action, characteristics of the action, and the participants. In one embodiment, acquired attribute data includes strings, numerical data, dates, lists, and other formatted data to be used for a policy decision. In one embodiment, the attribute source module 16 caches memory from internal and/or external sources. In one embodiment, the attribute source module includes at least one internal database, at least one rest API, which includes at least one exchange API, bittrex API, and/or identity API, at least one factory, which contains at least one distributed ledger, such as, ripple, stellar, and/or GoChain.

In one embodiment, rules contained in a recipe 14 is composed from attributes which further contain self-describing models for data collection and caching in support of rule evaluation. In one embodiment, an attribute describes the data type and format, source, the means to access the source, additional filtering and context data, and caching rules to manage the balance between performance and latency for specific attributes. In one embodiment, the attribute sources module 16 is operable to communicate with the rules engine 12 through an appropriate communication channel. As a nonlimiting example, where a recipe 14 contains a rule that limits the number of token holders, the rules engine 12 is operable to obtain the current number of token holders in order to evaluate the legitimacy (i.e., whether the proposed transaction is in compliance with a rule, regulation, and/or policy) of the requested transaction. In this example, the current number of token holders is obtained by querying the distributed ledger on which the token resides. In order to accomplish this, the attribute source module 16 contains instructions used by the rules engine 14 to query the ledger. In one embodiment, recipes 14 consist of a plurality of rules containing attributes requiring data from many different sources. In one embodiment, new recipes are developed, which require additional data not previously mapped. Advantageously, attribute mapping is performed through a flexible architecture that allows new sources to be injected into the engine efficiently and without affecting any other system operation.

In one embodiment, the rules engine 12 evaluates the recipe 14 associated with the desired object/verb combination and determines whether the right to perform the action/transaction can be granted (i.e., is in compliance). In one embodiment, a user's rights in a particular action are: utilized inline to govern a transaction in real time; stored on or off chain through at least one smart contract; and/or shared via RESTful API calls, SAML assertions, or OpenID Connect data format.

In one embodiment, rights are stored or cached at PEP 10. In one embodiment, rights and/or recipes have a predetermined time when they will expire, to accommodate for regulatory changes. In one embodiment, stored rights are invalidated due to changes in recipe rules or context. In one embodiment, the compliance enhanced architecture 100 forces a revalidation of rights in the event of a change of policy and/or rules associated with a proposed action. In one embodiment, rights are cached on chain via smart contracts (Ethereum, EOS, etc.) or ledger controls (Ripple, Stellar).

In one embodiment, the PEP 10 is operable to govern financial transactions by utilizing distribution controls through the use of ledger controls (for example, Ripple, Stellar, etc.). In one embodiment, the PEP 10 is operable to govern financial transactions by utilizing distribution controls through the use of smart contracts on a blockchain (for example, Ethereum, Electro-Optical System (EOS) and/or derivatives of blockchains). In one embodiment, the PEP 10 is operable to govern financial transactions by utilizing distribution controls through the use of interoperability and decorator pattern (i.e., cross ledger enforcement). In one embodiment, the PEP 10 is operable to govern financial transactions by utilizing distribution controls through the use of shared rights and permissions that are implemented on a centralized exchange and on third party systems.

In one embodiment, PEP 10 utilizes transaction callback methods and/or "trustlines." Trustlines are two-way agreements between the wallet owner and the token issuer or other designated party, which is stored on a ledger and govern the right of a wallet to participate in a token transaction. Advantageously, by utilizing callbacks, webhooks, the PEP 10 is operable to consult with external services, such as rules engine 12, to provide a fine-grained control over specific transactions.

Figure 6:
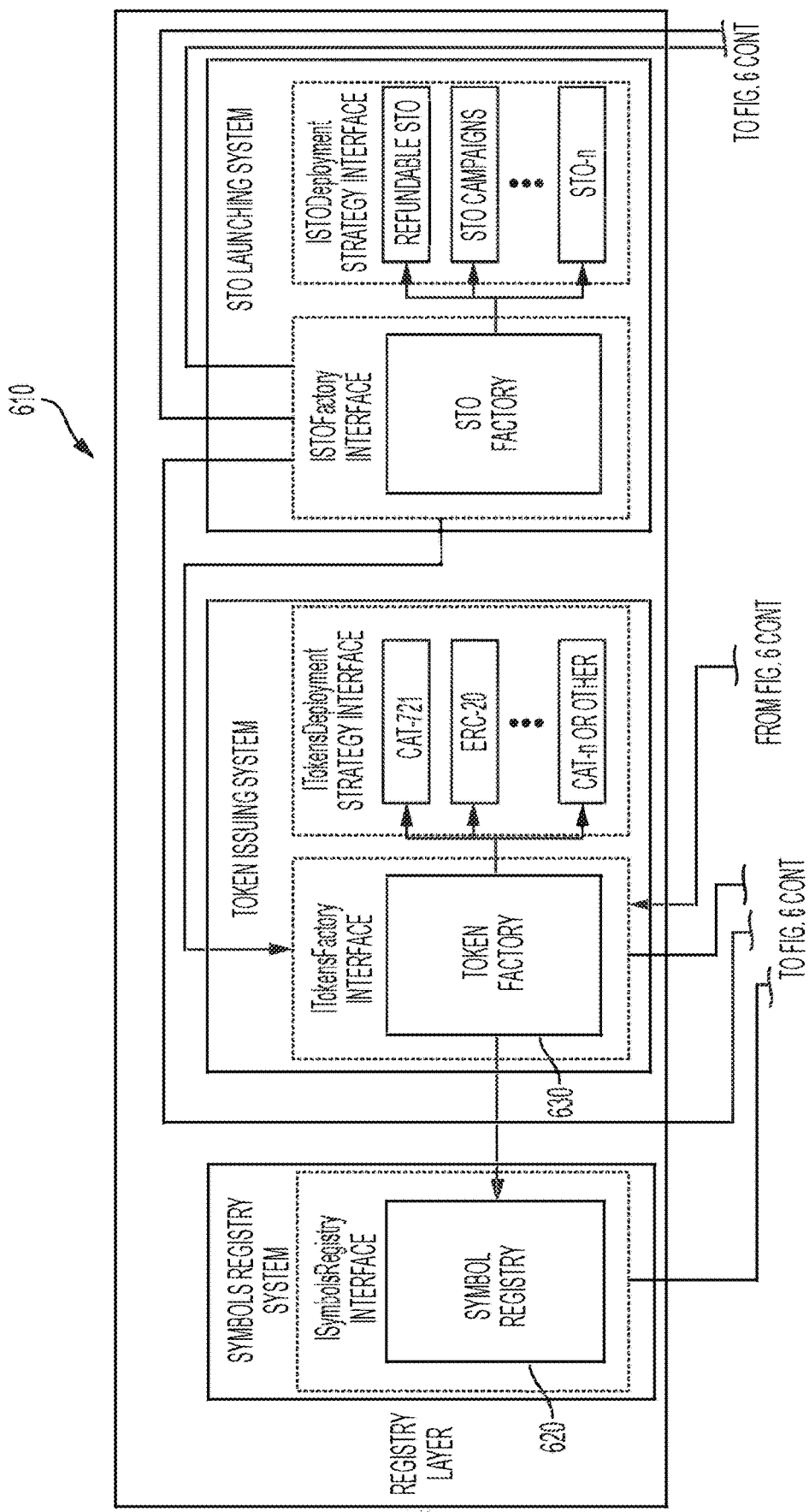
FIG. 6 illustrates a block diagram of the architecture of the blockchain enhanced policy enforcement point for DLTs implementing smart contract according to one embodiment.
Figure 6:
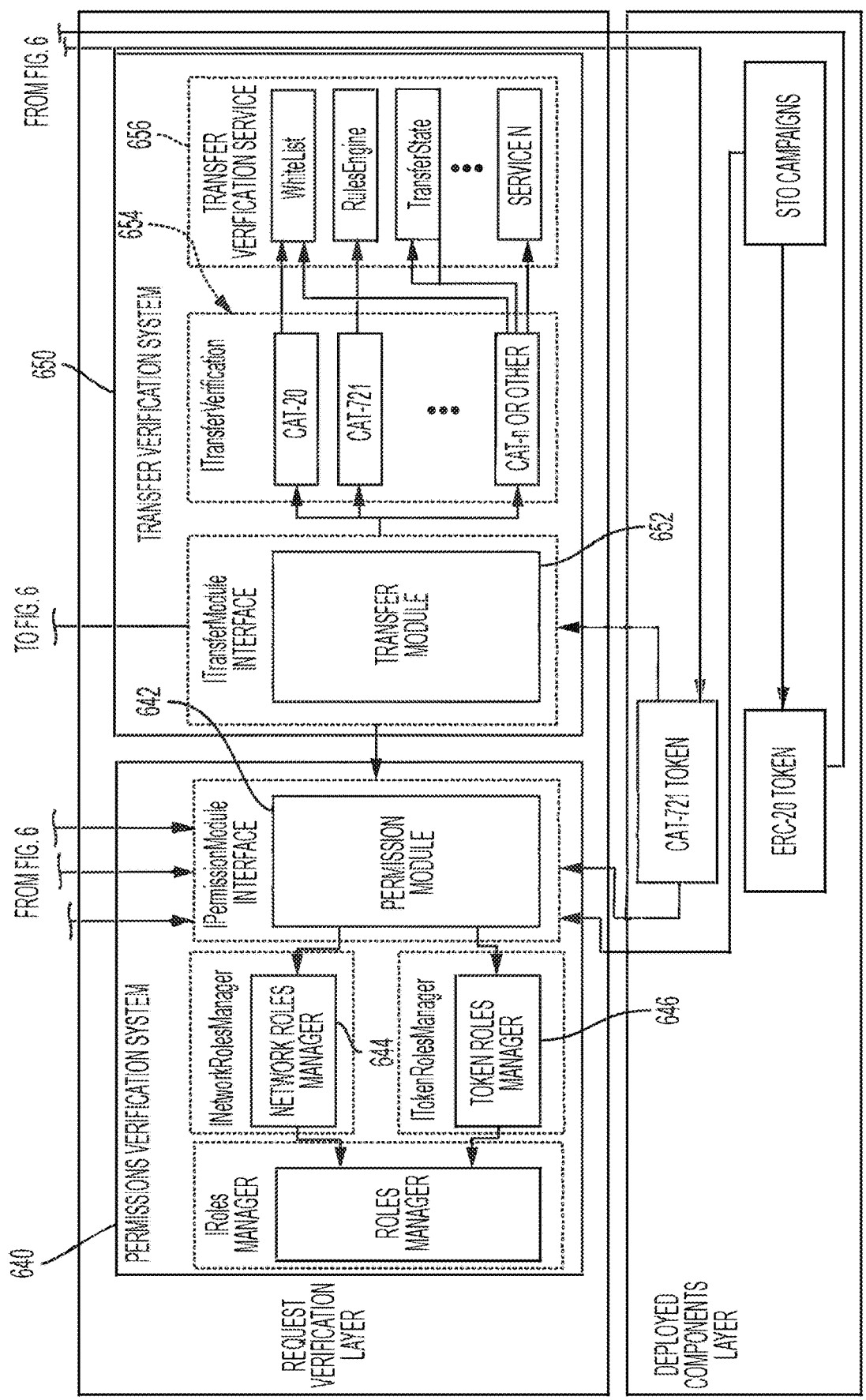

FIG. 6 illustrates an architecture of a blockchain enhanced PEP 610 for DLTs implementing smart contracts, that is, decentralized applications (dApps) that run via distributed nodes. In one embodiment, the blockchain enhanced PEP 610 supports a plurality of Ethereum token standards, such as, ERC20, ERC621, ERC721, and is extendable to support any other token protocol on any other blockchain known in the art. In one embodiment, the token standards are a set of agreed-upon rules that guide the design, development, behavior, and operation of the tokens on a given blockchain protocol. In one embodiment, using a smart contract executed by the blockchain enhanced PEP 610, token issuers, in real time, issue tokens with compliance controls built in and/or issue tokens that do not contain distribution controls. Advantageously, the smart contract provides enhancements that enable issuers to register symbol uniqueness on the network by means of symbol registry and enables issuers to govern distribution of the tokens through additional security and rules enforcement including compliance rollback transactions, value escrow, and freezing of wallets.

In one embodiment, the blockchain enhanced PEP 610 is operable to facilitate distribution control. In one embodiment, the blockchain enhanced PEP 610 includes a symbol registry 620 that is operable as a repository for token symbols. In one embodiment, the blockchain enhanced PEP 610 enables issuers to register token symbols prior to token creation, in order to protect trademark and brand rights prior to token deployment. In one embodiment, the blockchain enhanced PEP 610 includes a token factory 630 that is operable to accept requests to create new tokens, checks the relevant parameters, and deploys a token through a token strategy (e.g., the supported behavior of tokens governed by a standard). In one embodiment, the token factory 630 is operable to create tokens, delete deployment strategies, and/or update deployment strategies. In one embodiment, a deployment strategy is the smart contract that implements a token and that defines the token's behavior and interface. In one embodiment, a deployment strategy is linked to a token standard. In one embodiment, upon execution of a deployment strategy, the token is delivered with a common interface associated with the deployment strategy. As a nonlimiting example, the Token factory 630 is operable to support issuance of ERC-20, ERC-721, among other standards. In one embodiment, the token factory 630 is operable to updated or removed smart contracts over time. Advantageously, the disclosed implementation anticipates that many new strategies will emerge and will be added providing issuers a greater range of options in the behavior of their tokens.

In one embodiment, the blockchain enhanced PEP 610 includes a Permission verification system (PVS) 640. In one embodiment, the PVS 640 is operable to verify requests, which are processed in deployed smart contracts. In one embodiment, the PVS 640 is operable to evaluate recipes, cache rights, store wallet attributes, and reach external data sources to retrieve other attributes. In one embodiment, the PVS 640 includes a permission module 642. Advantageously, the permission module 642 is a flexible mechanism for creating and managing rights and roles used for accessing the ledger network components. In one embodiment, the permissions module 642 is operable to grant the ability to hold or transfer control over token issuance, symbol registration, registration of new verification services, adding/removing strategies, etc. In one embodiment, PVS 640 includes a network roles manager 644. In one embodiment, the network roles manager 644 is operable to verify the legitimacy of requests to register a symbol, create a token, add or modify available token strategies, and/or transfer verification services based on granted permissions. In one embodiment, the PVS 640 includes a token roles manager 646. In one embodiment, the token roles manager 646 is operable to verify requests relating specifically to a token. As a nonlimiting example, the requests include requests to add or remove tokens to/from a whitelist, or to execute a rollback transaction.

In one embodiment, the blockchain enhanced PEP 610 includes a transfer verification system (TVS) 650. In one embodiment, the TVS 650 is operable to assign policy and enforcement logic based on a token's assigned strategy. In one embodiment, the assigned strategy is the behaviors defined for the token based on the selection of smart contract assigned by the Token Factory 630. In one embodiment, each assigned strategy implements specific transfer verification logic and contains one or more enforcement services (e.g., whitelist, rules engine, etc.). In one embodiment, the TVS 650 includes a transfer module 652. In one embodiment, the transfer module 652 is operable to accepts requests on the token's transfer verification. In one embodiment, the transfer module 652 denies requests on the token's transfer verification. In one embodiment, the transfer module 652 requests a token standard from token factory 630. In one embodiment, based on the applicable token standard, the transfer module 652 selects transfer verification logic.

In one embodiment, the TVS 650 includes a transfer verification policy enforcement through transfer verification logic 654 specified for each token standard, such as Compliance Aware Token-20 (CAT-20), CAT-20, CAT-721, etc. In one embodiment, CAT-20 extends the Ethereum Request for Comment-20 (ERC-20) standard implementation to include distribution controls. In one embodiment, the TVS 650 is operable to apply an additional token standard and/or protocol on top of existing token standards (i.e., ERC-20), such that the token includes native standards and distribution controls. In this embodiment, the tokenized asset is subject to the standards and protocols native to the specific ledger the token is implemented on, in addition to the standards and protocols set in place by the TVS 650 to ensure the transfer is in regulatory compliance with the relevant policy. Similarly, standards for other fungible tokens are extendable to includes distribution controls. In one embodiment, the transfer verification logic 654 is implemented by means of different transfer verification services 656, such as, a whitelist, rules engine 12, state logic, and/or other services. In one embodiment, the transfer verification services 656 include services other than those listed in the preceding sentence. In one embodiment, transfer verification service 656 stores verified rights and attributes associated with tokens, wallets, and gathers data from on chain and off chain transactions. A nonlimiting example of a right stored by the transfer verification service 656, is a whitelist, which is operable to store a list of wallets that have been verified for specific transactions involving tokens. In one embodiment, the whitelist is used to verify the eligibility of all wallets involved in a transaction prior to sending or receiving requests. In one embodiment, where a wallet is not found in the whitelist the transaction is rejected. In one embodiment, transaction policies for a token are stored as recipes on chain through at least one smart contract. In one embodiment, attributes associated with a wallet's owner are stored on chain through at least one smart contract which, permits decentralized rule evaluation. In one embodiment, transaction policies for a token, policy decisions, recipes, and/or attributes associated with a wallet's owner are stored on chain by including hashed data, which is uniquely representative of the transaction policies and/or wallet attributes, within an output field of any transaction.

Figure 7:
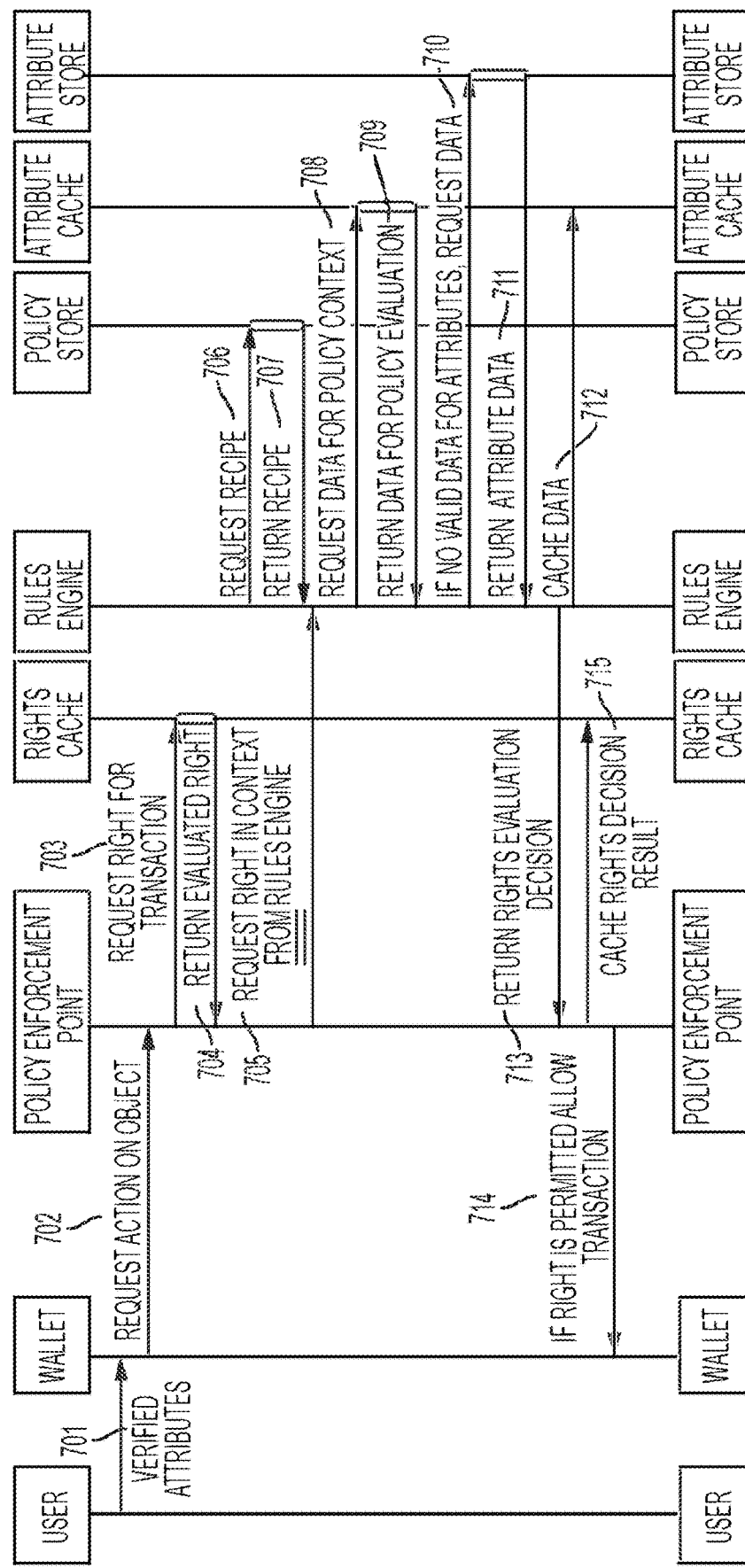
FIG. 7 illustrates a flow diagram of a process for determining rights and governing transaction according to one embodiment.

FIG. 7 illustrates a flow diagram of a process for determining rights and governing transaction according to one embodiment. With reference to FIG. 7, at 701, and in one embodiment, a user device confers verified attributes to a wallet utilizing the attribute verification process described above. In one embodiment, the attribute verification process determines the user's residence, and whether the user is an accredited or institutional investor. As a nonlimiting example, the attribute verification process determines that the user's country of jurisdiction is the United States and the user is an accredited investor. In one embodiment, with reference to FIG. 7, at 702, the user wallet makes a request to PEP10, for an action on an object. As a nonlimiting example, the wallet makes a request to transfer a token from the wallet owner to another participant. In this example the token is the token of FIG. 2 and represents a security being offered under Regulation D of Title 17: Commodity and Securities Exchanges PART 230—GENERAL RULES AND REGULATIONS, SECURITIES ACT OF 1933. Following, the token has a recipe that requires the following attributes: Jurisdiction: US, AND Accreditation=True. In one embodiment, the wallet making the request is a user device, such as, a personal computer, a mobile phone or other display device that has access to the wallet address and the user instructions are received through a GUI of the user device. Following the example, all participants in the transaction have the required attributes noted above (Jurisdiction: US, Accreditation:True). In one embodiment, with reference to FIG. 7 at 703, the PEP 10 requests rights for the token and the participants involved in the transaction from a rights cache of the rules engine 12. Following the example, the rights cache includes previously evaluated rights for desired token and the participants involved in the transaction. In one embodiment, with reference to FIG. 7 at 704, if the evaluated rights for requested transaction are available in the cache (e.g., the transaction and/or the participants involved have been previously involved in another action), the evaluated rights for the request is returned to the PEP10 directly from the cache. In one embodiment, the process continues to step 713. Advantageously, cached rights reduce latency of making the policy decision.

In one embodiment, where the rights have not been previously evaluated for the specific attributes, (e.g., cached), and thus not returned to PEP 12 at 704, new rights are evaluated for the context. In one embodiment, in order to create new rights, at 705, PEP 12 makes a request for rights in the transaction context from the rules engine 12. In one embodiment, at 706, the rules engine 12 makes a request for a recipe corresponding to the requested rights for the context and the recipe is returned to the rules engine 12 at 707. In one embodiment, at 708, rules engine 12 requests additional data for the relevant context from an attribute cache. In one embodiment, where the relevant data is in the attribute cache, the data is returned for policy evaluation at 709. In one embodiment, the relevant data includes credit ratings, jurisdictional data, investors qualifications, collateral information, trade match information, account balances, reporting documents filed, and similar information that is required for the policy evaluation. In one embodiment where the relevant data as not been cached, rules engine 12 requests the data from another source, such as an attribute store at 710 and the attributes are returned to the rules engine 12 at 711. In one embodiment, data is stored in attribute cache for later use at 712. In one embodiment, at 713, rights are returned to the PEP 10 for a policy decision based on the recipe 14, user attributes, token attributes, and/or other relevant external data. As a nonlimiting example, a token represents a security to be sold under Regulation D, the relevant recipe is expressed below:

(1) participants must be US persons,
(2) participants must be accredited individual or institutional investors,
(3) participants must have read risk disclosures associated with the offering.

In reality, the actual requirements of Reg D and any other requirements are much more complicated than the example above. In one embodiment where the returned rights are determined by PEP 10 to be permitted, the wallet 20 is permitted to conduct the requested transaction at 714. In one embodiment following a permitted transaction, the evaluated rights are cached in rights cache for later use at 715.

Figure 8:
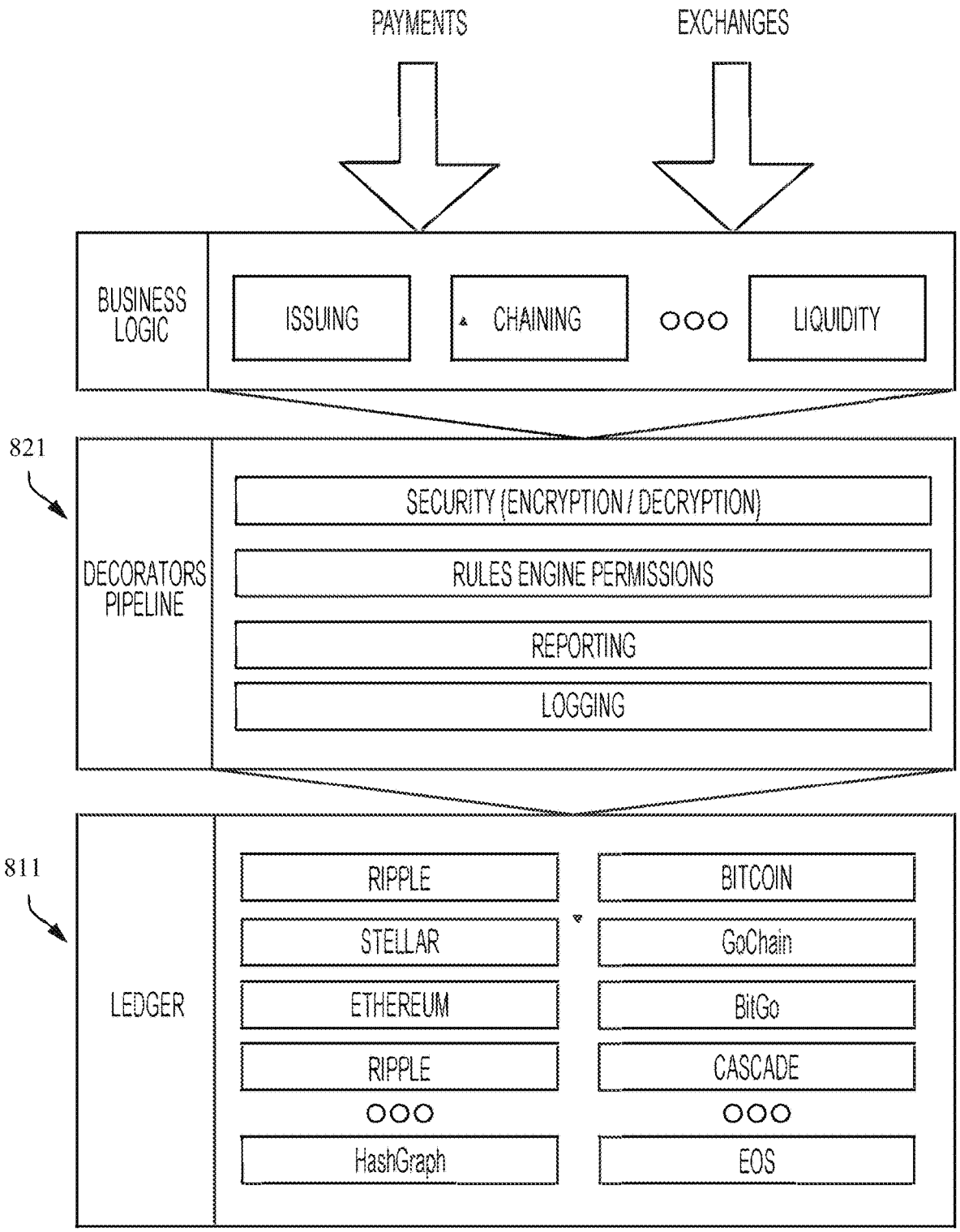
FIG. 8 illustrates an implementation of an interoperability layer and decorator pattern that provides cross ledger policy enforcement.

FIG. 8 illustrates a diagram of an interoperability layer and a decorator pattern of the present invention according to one embodiment. In one embodiment, the invention of the present application uses a policy enforcement mechanism that supports transaction governance on chain, off chain, and/or through a hybrid of on chain and off chain. Advantageously, this implementation permits consistent rules enforcement across dissimilar ledgers 811 including traditional financial service infrastructures by using the interoperability layer and a decorator pattern. In one embodiment, the decorator pattern is operable to intercept similar actions across dissimilar networks and/or blockchains and execute common security and compliance functions. In one embodiment, the decorator pattern is operable is query dissimilar ledgers 811 for similar actions. In one embodiment, the decorator pattern is operable to log the results of a query to dissimilar ledger 811 and encoded the results into byte code. In one embodiment, the decorator pattern is operable to report and interpret the byte code by a smart contract to execute similar functions across the dissimilar ledgers 811. In one embodiment, the byte code is executed and interpreted by the PEP 10. In one embodiment, the PEP 10 is operable to interpret the byte code from dissimilar ledgers 811 to execute compliance functions. In one embodiment, this abstraction layer is operable to extend or override governance of specific transactions that have intrinsic controls.

In one embodiment, the invention of the present application implements an interoperability layer and a decorator pattern with the policy enforcement mechanism of the PEP 10 to support transaction governance on chain, off chain, and/or through a hybrid of on chain and off chain implementations. Advantageously, by implementing the PEP 10 with an interoperability layer and decorator pattern compatible with dissimilar ledgers 811 and traditional financial service infrastructures, the PEP 10 permits consistent rule enforcement across a plurality of ledgers and networks.

In one embodiment, in the decorator pattern, transactions are routed through decorators pipeline 821. In one embodiment, the decorator pipeline 821 is a federated service bus that provides policy enforcement, security functions, and automated logging, reporting, and oversight of an underlying action. In one embodiment, the decorator pattern is part of an abstraction layer that is operable to route transactions to the appropriate financial system, exchange, and/or ledger technology to execute the transaction. Advantageously, this implementation provides common policy enforcement across dissimilar financial systems.

In one embodiment, rights are obtained by 3rd party systems, such as an exchange platform, for internal policy enforcement. In one embodiment, rights are obtained at the time of a user's login via a direct request to the rules engine 12 and/or indirectly through SAML assertions provided by an identity and attributes service. In one embodiment, the 3rd party system obtains a comprehensive set of rights (verb/object combinations) associated with the user in the given context and scope. In one embodiment, these rights are used to govern transactions on the exchange using the native permission framework used by the 3rd party system.

In one embodiment, the user's right to engage in a transaction (such as the trade or transfer of a token) is assessed in advance of the transaction or at the time of the transaction and stored in a cache for real time governance. In one embodiment, the user's right to perform an action on a token is determined through a request to the appropriate policy enforcement point. In one embodiment, where a transaction is granted, the user's right is stored on and/or off ledger in a cache with an expiration as appropriate.

In one embodiment, the compliance enhanced architecture 100 is operable to assess more than just the legal identity of at least one participant. In one embodiment, the compliance enhanced architecture 100 is operable to assess whether a risk disclosure statement is required to be made for a proposed transaction, whether the at least one participant is an accredited individual and/or an institutional investor, the at least one participant's country of jurisdiction, whether at least one participant is included in a relevant whitelist, and/or whether the proposed transaction is in compliance with the token's token standard. In one embodiment, the compliance enhanced architecture 100 is operable to consider and asses the at least one participant's name, complete address, PIN code, Permanent Account Number (PAN), mobile number, email address, income details and ranges, and/or details of any relevant custodians. In one embodiment, the compliance enhanced architecture 100 is operable to consider and asses token attributes, wallet attributes, and/or the number of token holders to a proposed transaction.

Figure 9:
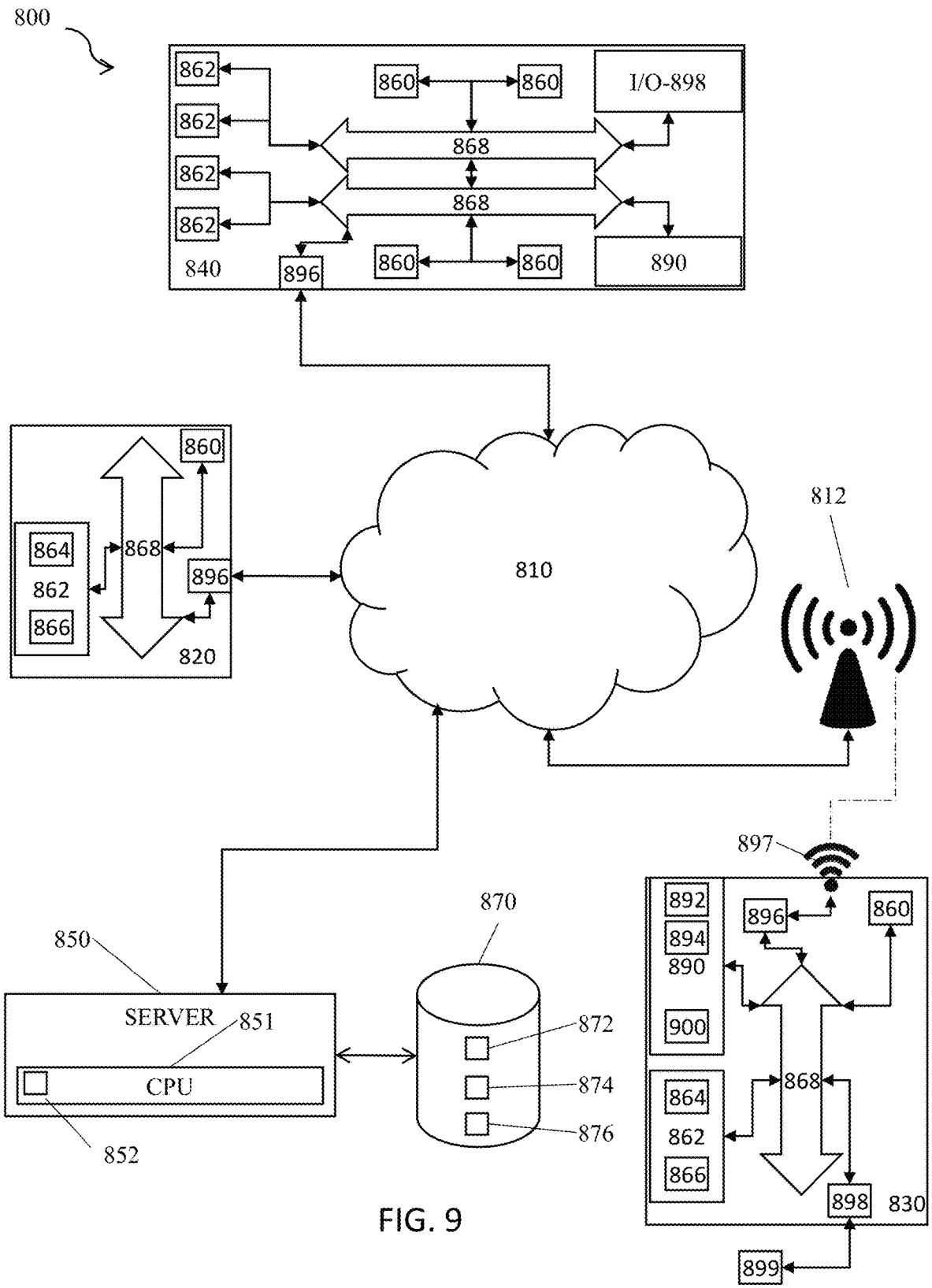
FIG. 9 is a schematic diagram of a system of the present invention.

FIG. 9 is a schematic diagram of an embodiment of the invention illustrating a computer system, generally described as 800, having a network 810, a plurality of computing devices 820, 830, 840, a server 850, and a database 870.

The server 850 is constructed, configured, and coupled to enable communication over a network 810 with a plurality of computing devices 820, 830, 840. The server 850 includes a processing unit 851 with an operating system 852. The operating system 852 enables the server 850 to communicate through network 810 with the remote, distributed user devices. Database 870 is operable to house an operating system 872, memory 874, and programs 876.

In one embodiment of the invention, the system 800 includes a network 810 for distributed communication via a wireless communication antenna 812 and processing by at least one mobile communication computing device 830. Alternatively, wireless and wired communication and connectivity between devices and components described herein include wireless network communication such as WI-FI, WORLDWIDE INTEROPERABILITY FOR MICROWAVE ACCESS (WIMAX), Radio Frequency (RF) communication including RF identification (RFID), NEAR FIELD COMMUNICATION (NFC), BLUETOOTH including BLUETOOTH LOW ENERGY (BLE), ZIGBEE, Infrared (IR) communication, cellular communication, satellite communication, Universal Serial Bus (USB), Ethernet communications, communication via fiber-optic cables, coaxial cables, twisted pair cables, and/or any other type of wireless or wired communication. In another embodiment of the invention, the system 800 is a virtualized computing system capable of executing any or all aspects of software and/or application components presented herein on the computing devices 820, 830, 840. In certain aspects, the computer system 800 is operable to be implemented using hardware or a combination of software and hardware, either in a dedicated computing device, or integrated into another entity, or distributed across multiple entities or computing devices.

By way of example, and not limitation, the computing devices 820, 830, 840 are intended to represent various forms of electronic devices including at least a processor and a memory, such as a server, blade server, mainframe, mobile phone, personal digital assistant (PDA), smartphone, desktop computer, netbook computer, tablet computer, workstation, laptop, and other similar computing devices. The components shown here, their connections and relationships, and their functions, are meant to be exemplary only, and are not meant to limit implementations of the invention described and/or claimed in the present application.

In one embodiment, the computing device 820 includes components such as a processor 860, a system memory 862 having a random access memory (RAM) 864 and a read-only memory (ROM) 866, and a system bus 868 that couples the memory 862 to the processor 860. In another embodiment, the computing device 830 is operable to additionally include components such as a storage device 890 for storing the operating system 892 and one or more application programs 894, a network interface unit 896, and/or an input/output controller 898. Each of the components is operable to be coupled to each other through at least one bus 868. The input/output controller 898 is operable to receive and process input from, or provide output to, a number of other devices 899, including, but not limited to, alphanumeric input devices, mice, electronic styluses, display units, touch screens, gaming controllers, joy sticks, touch pads, signal generation devices (e.g., speakers), augmented reality/virtual reality (AR/VR) devices (e.g., AR/VR headsets), or printers.

By way of example, and not limitation, the processor 860 is operable to be a general-purpose microprocessor (e.g., a central processing unit (CPU)), a graphics processing unit (GPU), a microcontroller, a Digital Signal Processor (DSP), an Application Specific Integrated Circuit (ASIC), a Field Programmable Gate Array (FPGA), a Programmable Logic Device (PLD), a controller, a state machine, gated or transistor logic, discrete hardware components, or any other suitable entity or combinations thereof that can perform calculations, process instructions for execution, and/or other manipulations of information.

In another implementation, shown as 840 in FIG. 9, multiple processors 860 and/or multiple buses 868 are operable to be used, as appropriate, along with multiple memories 862 of multiple types (e.g., a combination of a DSP and a microprocessor, a plurality of microprocessors, one or more microprocessors in conjunction with a DSP core).

Also, multiple computing devices are operable to be connected, with each device providing portions of the necessary operations (e.g., a server bank, a group of blade servers, or a multi-processor system). Alternatively, some steps or methods are operable to be performed by circuitry that is specific to a given function.

According to various embodiments, the computer system 800 is operable to operate in a networked environment using logical connections to local and/or remote computing devices 820, 830, 840 through a network 810. A computing device 830 is operable to connect to a network 810 through a network interface unit 896 connected to a bus 868. Computing devices are operable to communicate communication media through wired networks, direct-wired connections or wirelessly, such as acoustic, RF, or infrared, through an antenna 897 in communication with the network antenna 812 and the network interface unit 896, which are operable to include digital signal processing circuitry when necessary. The network interface unit 896 is operable to provide for communications under various modes or protocols.

In one or more exemplary aspects, the instructions are operable to be implemented in hardware, software, firmware, or any combinations thereof. A computer readable medium is operable to provide volatile or non-volatile storage for one or more sets of instructions, such as operating systems, data structures, program modules, applications, or other data embodying any one or more of the methodologies or functions described herein. The computer readable medium is operable to include the memory 862, the processor 860, and/or the storage media 890 and is operable be a single medium or multiple media (e.g., a centralized or distributed computer system) that store the one or more sets of instructions 900. Non-transitory computer readable media includes all computer readable media, with the sole exception being a transitory, propagating signal per se. The instructions 900 are further operable to be transmitted or received over the network 810 via the network interface unit 896 as communication media, which is operable to include a modulated data signal such as a carrier wave or other transport mechanism and includes any delivery media. The term "modulated data signal" means a signal that has one or more of its characteristics changed or set in a manner as to encode information in the signal.

Storage devices 890 and memory 862 include, but are not limited to, volatile and non-volatile media such as cache, RAM, ROM, EPROM, EEPROM, FLASH memory, or other solid state memory technology; discs (e.g., digital versatile discs (DVD), HD-DVD, BLU-RAY, compact disc (CD), or CD-ROM) or other optical storage; magnetic cassettes, magnetic tape, magnetic disk storage, floppy disks, or other magnetic storage devices; or any other medium that can be used to store the computer readable instructions and which can be accessed by the computer system 800.

In one embodiment, the computer system 800 is within a cloud-based network. In one embodiment, the server 850 is a designated physical server for distributed computing devices 820, 830, and 840. In one embodiment, the server 850 is a cloud-based server platform. In one embodiment, the cloud-based server platform hosts serverless functions for distributed computing devices 820, 830, and 840.

In another embodiment, the computer system 800 is within an edge computing network. The server 850 is an edge server, and the database 870 is an edge database. The edge server 850 and the edge database 870 are part of an edge computing platform. In one embodiment, the edge server 850 and the edge database 870 are designated to distributed computing devices 820, 830, and 840. In one embodiment, the edge server 850 and the edge database 870 are not designated for distributed computing devices 820, 830, and 840. The distributed computing devices 820, 830, and 840 connect to an edge server in the edge computing network based on proximity, availability, latency, bandwidth, and/or other factors.

It is also contemplated that the computer system 800 is operable to not include all of the components shown in FIG. 9, is operable to include other components that are not explicitly shown in FIG. 9, or is operable to utilize an architecture completely different than that shown in FIG. 9. The various illustrative logical blocks, modules, elements, circuits, and algorithms described in connection with the embodiments disclosed herein are operable to be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application (e.g., arranged in a different order or partitioned in a different way), but such implementation decisions should not be interpreted as causing a departure from the scope of the present invention.

Data Stored on a Distributed Ledger

In a preferred embodiment, the platform is operable to store data on a distributed ledger, e.g., a blockchain. Distributed ledger technology refers to an infrastructure of replicated, shared, and synchronized digital data that is decentralized and distributed across a plurality of machines, or nodes. The nodes include but are not limited to a mobile device, a computer, a server, and/or any combination thereof. Data is replicated and synchronized across a network of nodes such that each node has a complete copy of the distributed ledger. The replication and synchronization of data across a distributed set of devices provides increased transparency over traditional data storage systems, as multiple devices have access to the same set of records and/or database. Additionally, the use of distributed ledgers eliminates the need for third party and/or administrative authorities because each of the nodes in the network is operable to receive, validate, and store additional data, thus creating a truly decentralized system. Eliminating the third party and/or administrative authorities saves time and cost. A decentralized database is also more secure than traditional databases, which are stored on a single device and/or server because the decentralized data is replicated and spread out over both physical and digital space to segregated and independent nodes, making it more difficult to attack and/or irreparably tamper with the data. Tampering with the data at one location does not automatically affect the identical data stored at other nodes, thus providing greater data security.

In addition to the decentralized storage of the distributed ledger, which requires a plurality of nodes, the distributed ledger has further advantages in the way that data is received, validated, communicated, and added to the ledger. When new data is added to the distributed ledger, it must be validated by a portion of the nodes (e.g., 51%) involved in maintaining the ledger in a process called consensus. Proof of work, proof of stake, delegated proof of stake, proof of space, proof of capacity, proof of activity, proof of elapsed time, and/or proof of authority consensus are all compatible with the present invention, as are other forms of consensus known in the art. In one embodiment, the present invention uses fault-tolerant consensus systems. Each node in the system is operable to participate in consensus, e.g., by performing at least one calculation, performing at least one function, allocating compute resources, allocating at least one token, and/or storing data. It is necessary for a portion of the nodes in the system (e.g., 51% of the nodes) to participate in consensus in order for new data to be added to the distributed ledger. Advantageously, requiring that the portion of the nodes participate in consensus while all nodes are operable to participate in consensus means that authority to modify the ledger is not allocated to one node or even a group of nodes but rather is equally distributed across all of the nodes in the system. In one embodiment, a node that participates in consensus is rewarded, e.g., with a digital token, in a process called mining.

The blockchain is a commonly used implementation of a distributed ledger and was described in Satoshi Nakamoto's whitepaper Bitcoin: A Peer-to-Peer Electronic Cash System, which was published in October 2008 and which is incorporated herein by reference in its entirety. In the blockchain, additional data is added to the ledger in the form of a block. Each block is linked to its preceding block with a cryptographic hash, which is a one-way mapping function of the data in the preceding block that cannot practically be computed in reverse. In one embodiment, a timestamp is also included in the hash. The computation of the cryptographic hash based on data in a preceding block is a computationally intensive task that could not practically be conducted as a mental process. The use of cryptographic hashes means that each block is sequentially related to the block before it and the block after it, making the chain as a whole immutable. Data in a block in a preferred embodiment cannot be retroactively altered after it is added to the chain because doing so changes the associated hash, which affects all subsequent blocks in the chain and which breaks the mapping of the preceding block. The blockchain is an improvement on existing methods of data storage because it connects blocks of data in an immutable fashion. Additionally, the blockchain is then replicated and synchronized across all nodes in the system, ensuring a distributed ledger. Any attempted changes to the blockchain are propagated across a decentralized network, which increases the responsiveness of the system to detect and eliminate fraudulent behavior compared to non-distributed data storage systems. The blockchain and the distributed ledger solve problems inherent to computer networking technology by providing a secure and decentralized way of storing data that is immutable and has high fault tolerance. The distributed ledger stores digital data and is thus inextricably tied to computer technology. Additional information about the blockchain is included in *The Business of Blockchain* by William Mougavar published in April 2016, which is incorporated herein by reference in its entirety.

In one embodiment, the data added to the distributed ledger of the present invention include digital signatures. A digital signature links a piece of data (e.g., a block) to a digital identity (e.g., a user account). In one embodiment, the digital signature is created using a cryptographic hash and at least one private key for a user. The content of the piece of data is used to produce a cryptographic hash. The cryptographic hash and the at least one private key are used to create the digital signature using a signature algorithm. The digital signature is only operable to be created using a private key. However, the digital signature is operable to be decoded and/or verified using a public key also corresponding to the user. The separation of public keys and private keys means that external parties can verify a digital signature of a user using a public key but cannot replicate the digital signature since they do not have a private key. Digital signatures are not merely electronic analogs of traditional physical signatures. Physical signatures are easily accessible and easily replicable by hand. In addition, there is no standard algorithm to verify a physical signature except comparing a first signature with a second signature from the same person via visual inspection, which is not always possible. In one embodiment, the digital signatures are created using the data that is being linked to the digital identity whereas physical signatures are only related to the identity of the signer and are agnostic of what is being signed. Furthermore, digital signatures are transformed into a cryptographic hash using a private key, which is a proof of identity of which there is no physical or pre-electronic analog. Digital signatures, and cryptographic hashes in general, are of sufficient data size and complexity to not be understood by human mental work, let alone verified through the use of keys and corresponding algorithms by human mental work. Therefore, creating, decoding, and/or verifying digital signatures with the human mind is highly impractical.

Public, private, consortium, and hybrid blockchains are compatible with the present invention. In one embodiment, the blockchain system used by the present invention includes sidechains wherein the sidechains run parallel to a primary chain. Implementations of distributed ledger and/or blockchain technology including, but not limited to, BITCOIN, ETHEREUM, HASHGRAPH, BINANCE, FLOW, TRON, TEZOS, COSMOS, and/or RIPPLE are compatible with the present invention. In one embodiment, the platform includes at least one acyclic graph ledger (e.g., at least one tangle and/or at least one hashgraph). In one embodiment, the platform includes at least one quantum computing ledger.

In one embodiment, the present invention further includes the use of at least one smart contract, wherein a smart contract includes a set of automatically executable steps and/or instructions that are dependent on agreed-upon terms. The smart contract includes information including, but not limited to, at least one contracting party, at least one contract address, contract data, and/or at least one contract term. In one embodiment, the at least one smart contract is deployed on a blockchain such that the at least one smart contract is also stored on a distributed node infrastructure. In one embodiment, the terms of the at least one smart contract are dependent on changes to the blockchain. For example, a provision of the at least one smart contract executes when a new block is added to the blockchain that meets the terms of the at least one smart contract. The smart contract is preferably executed automatically when the new block is added to the blockchain. In one embodiment, a first smart contract is operable to invoke a second smart contract when executed. A smart contract is operable to capture and store state information about the current state of the blockchain and/or the distributed ledger at any point in time. Advantageously, a smart contract is more transparent than traditional coded contracts because it is stored on a distributed ledger. Additionally, all executions of the smart contract are immutably stored and accessible on the distributed ledger, which is an improvement over non-distributed, stateless coded contracts. In one embodiment, the state information is also stored on a distributed ledger.

Cryptocurrency Transactions

Distributed ledger technology further enables the use of cryptocurrencies. A cryptocurrency is a digital asset wherein ownership records and transaction records of a unit of cryptocurrency (typically a token) are stored in a digital ledger using cryptography. Use of centralized cryptocurrencies and decentralized cryptocurrencies are both compatible with the present invention. Centralized cryptocurrencies are minted prior to issuance and/or are issued by a single body. Records of a decentralized cryptocurrency are stored on a distributed ledger (e.g., a blockchain), and any node participating in the distributed ledger is operable to mint the decentralized cryptocurrency. The distributed ledger thus serves as a public record of financial transactions. Cryptocurrencies are typically fungible in that each token of a given cryptocurrency is interchangeable. The present invention is operable to facilitate transactions of at least one cryptocurrency, including, but not limited to, BITCOIN, LITECOIN, RIPPLE, NXT, DASH, STELLAR, BINANCE COIN, and/or ETHEREUM. In one embodiment, the present invention is operable to facilitate transactions of stablecoins, NEO Enhancement Protocol (NEP) tokens, and/or BINANCE Chain Evolution Proposal (BEP) tokens. In one embodiment, the present invention is operable to support tokens created using the ETHEREUM Request for Comment (ERC) standards as described by the Ethereum Improvement Proposals (EIP). For example, the present invention is operable to support ERC-20-compatible tokens, which are created using the *EIP-20: ERC-20 Token Standard*, published by Vogelsteller, et al., on Nov. 19, 2015, which is incorporated herein by reference in its entirety.

A cryptocurrency wallet stores keys for cryptocurrency transactions. As cryptocurrency is a virtual currency, the ability to access and transfer cryptocurrency must be protected through physical and/or virtual means such that such actions are only operable to be performed by the rightful owner and/or parties with permission. In one embodiment, a cryptocurrency wallet stores a private key and a public key. In another embodiment, the cryptocurrency wallet is operable to create the private key and/or the public key, encrypt data, and/or sign data (e.g., with a digital signature). In one embodiment, the private key is generated via a first cryptographic algorithm wherein the input to the first cryptographic algorithm is random. Alternatively, the input to the first cryptographic algorithm is non-random. In one embodiment, the public key is generated from the private key using a second cryptographic algorithm. In one embodiment, the first cryptographic algorithm and the second cryptographic algorithm are the same. The private key is only accessible to the owner of the cryptocurrency wallet, while the public key is accessible to the owner of the cryptocurrency wallet as well as a receiving party receiving cryptocurrency from the owner of the cryptocurrency wallet. Deterministic and non-deterministic cryptocurrency wallets are compatible with the present invention.

As a non-limiting example, a cryptocurrency transaction between a first party and a second party involves the first party using a private key to sign a transaction wherein the transaction includes data on a first cryptocurrency wallet belonging to the first party, the amount of the transaction, and a second cryptocurrency wallet belonging to the second party. In one embodiment, the second cryptocurrency wallet is identified by a public key. The transaction is then populated to a distributed network wherein a proportion (e.g., 51%) of the nodes of the distributed network verify the transaction. Verifying the transaction includes verifying that the private key corresponds to the first cryptocurrency wallet and that the amount of the transaction is available in the first cryptocurrency wallet. The nodes then record the transaction on the distributed ledger, e.g., by adding a block to a blockchain. Fulfilling the cryptocurrency transaction is a computationally intensive process due to key cryptography and the consensus necessary for adding data to the distributed ledger that could not practically be performed in the human mind. In one embodiment, a node is operable to verify a block of transactions rather than a single transaction.

Desktop wallets, mobile wallets, hardware wallets, and web wallets are compatible with the present invention. A software wallet (e.g., a desktop wallet, a mobile wallet, a web wallet) stores private and/or public keys in software. A hardware wallet stores and isolates private and/or public keys in a physical unit, e.g., a universal serial bus (USB) flash drive. The hardware wallet is not connected to the internet or any form of wireless communication, thus the data stored on the hardware wallet is not accessible unless the hardware wallet is connected to an external device with network connection, e.g., a computer. In one embodiment, the data on the hardware wallet is not operable to be transferred out of the hardware wallet. In one embodiment, the hardware wallet includes further data security measures, e.g., a password requirement and/or a biometric identifier requirement. In one embodiment, the present invention is operable to integrate a third-party cryptocurrency wallet. Alternatively, the present invention is operable to integrate a payments platform that is compatible with cryptocurrency, including, but not limited to, VENMO, PAYPAL, COINBASE, and/or payments platforms associated with financial institutions.

Tokenization

In one embodiment, the platform is operable to tokenize assets. A token is a piece of data that is stored on the distributed digital ledger and that can be used to represent a physical and/or a digital asset, e.g., in a transaction, in an inventory. The token is not the asset itself; however, possession and transfer of the token are stored on the distributed digital ledger, thus creating an immutable record of ownership. In one embodiment, the token includes cryptographic hashes of asset data, wherein the asset data is related to the asset. In one embodiment, the asset data is a chain of data blocks. For example, the asset is a work of digital art, and the asset data includes data about the work such as information about an artist, a subject matter, a file type, color data, etc. The corresponding token includes a cryptographic hash of the asset data, which describes the work. Alternative mappings of the asset data to the token are also compatible with the present invention. In one embodiment, the token is a non-fungible token (NFT). A first non-fungible token is not directly interchangeable with a second non-fungible token; rather, the value of the first token and the second token are determined in terms of a fungible unit (e.g., a currency). In one embodiment, the platform is operable to support ETHEREUM standards for tokenization, including, but not limited to, *EIP-721: ERC-721 Non-Fungible Token Standard* by Entriken, et al., which was published Jan. 24, 2018 and which is incorporated herein by reference in its entirety. In one embodiment, the platform is operable to create fractional NFTs (f-NFTs), wherein each f-NFT represents a portion of the asset. Ownership of an f-NFT corresponds to partial ownership of the asset.

The various functions disclosed herein can be accomplished by one or more computing devices having processors which execute instructions stored in one or more tangible computer readable memories. The various devices can be communicatively coupled to one another in known manners using known protocols. For example, the devices can be coupled over a Local Area Network or the Internet and affect ledgers that may reside on centralized, private decentralized, or public decentralized networks.

Additional alternative structural and functional designs may be implemented for enforcing compliance policies on decentralized financial transactions. Thus, while implementations and examples have been illustrated and described, it is to be understood that the invention is not limited to the precise construction and components disclosed herein. Various modifications, changes and variations may be made in the arrangement, operation and details of the method and apparatus disclosed herein without departing from the spirit and scope of the invention defined in the appended claims.

Certain modifications and improvements will occur to those skilled in the art upon a reading of the foregoing description. The above-mentioned examples are provided to serve the purpose of clarifying the aspects of the invention and it will be apparent to one skilled in the art that they do not serve to limit the scope of the invention. All modifications and improvements have been deleted herein for the sake of conciseness and readability but are properly within the scope of the present invention.

What is claimed is:

1. A system for enforcing a ruleset for a decentralized financial transaction comprising:
    at least one computer processor and at least one memory having instructions stored therein;
    a compliance enhanced architecture in network communication with at least one server computer and at least one distributed ledger;
    wherein the compliance enhanced architecture includes a Policy Enforcement Point (PEP), a rules engine, at least one recipe, and an attribute source module;
    wherein the compliance enhanced architecture is operable to establish a link between at least one participant and at least one wallet on the at least one distributed ledger;
    wherein the at least one wallet corresponds to a unique address on the at least one distributed ledger;
    wherein the PEP is operable to receive a proposed transaction from the at least one wallet to transfer at least one digital token representing at least one asset;
    wherein the attribute source module is operable to determine at least one participant attribute attributable to the at least one participant, at least one token attribute attributable to the at least one digital token, and/or at least one transaction attribute attributable to the proposed transaction;
    wherein the at least one recipe is computer interpretable code of a compliance, regulatory, and/or other governance policy rule and/or ruleset, wherein the other governance policy rule and/or ruleset includes securities laws and/or transaction controls of a jurisdiction;
    wherein the at least one recipe includes a Subject Verb Object (SVO) structure in which the at least one participant is assigned as a subject, the proposed transaction is assigned as a verb, and the at least one digital token is assigned as an object;
    wherein the rules engine is operable to determine a policy decision by comparing the at least one participant attribute, the at least one digital token attribute, and the at least one transaction attribute to the at least one recipe;
    wherein the PEP is operable to determine at least one right to perform the proposed transaction based on the policy decision;
    wherein the PEP is operable to permit or deny the proposed transaction based on the presence or absence of the at least one right;
    wherein compliance enhanced architecture further includes an interoperability layer and a decorator pattern;
    wherein the interoperability layer is operable to implement the PEP on the distributed ledger, off the distributed ledger, and/or partially on the distributed ledger and partially off the distributed ledger; and
    wherein the decorator pattern is operable to intercept at least one action across dissimilar distributed ledgers and execute compliance functions of the PEP across the dissimilar distributed ledgers.

2. The system of claim 1, wherein the PEP is operable to govern a tokenized asset transaction between participants in an enterprise, blockchain network, and/or computer network.

3. The system of claim 1, wherein the compliance enhanced architecture is operable to assess a risk disclosure statement required for a proposed transaction, whether the at least one participant is an accredited investor, a country of jurisdiction of the at least one participant, and/or whether the at least one participant is included in a relevant whitelist.

4. The system of claim 1, wherein the PEP is implemented onto a distributed ledger though at least one smart contract.

5. The system of claim 1, wherein the rules engine is implemented onto a distributed ledger through at least one smart contract.

6. The system of claim 1, wherein the PEP is operable to provide federated rights assessment, off a distributed ledger, through Security Assertion Markup Language (SAML).

7. The system of claim 1, wherein the rules engine is operable to cache the at least one recipe to facilitate rapid policy decisions.

8. The system of claim 1, wherein the at least one recipe is created manually through a Graphical User Interface (GUI) on a display device in network communication with the at least one server computer.

9. The system of claim 1, wherein the attribute source module includes at least one internal database, at least one rest Application Programming Interface (API), an exchange API, a bittrex API, and/or an identity API.

10. The system of claim 1, wherein the digital token represents a security.

11. The system of claim 10, wherein the at least one recipe includes rules and regulations of the Securities and Exchange Commission (SEC) and/or other major securities laws pertinent to the security or the digital token.

12. The system of claim 11, wherein the PEP is operable to enforce the rules and regulations of the SEC for a transaction of the security or the digital token.

13. The system of claim 1, wherein the rules engine is located off the at least one distributed ledger while being operable to evaluate information stored on the at least one distributed ledger.

14. A system for enforcing a ruleset for a decentralized financial transaction comprising:
    at least one computer processor and at least one memory having instructions stored therein;
    a compliance enhanced architecture in network communication with at least one server computer and at least one distributed ledger;
    wherein the compliance enhanced architecture includes a Policy Enforcement Point (PEP), a rules engine, at least one recipe, and an attribute source module;
    wherein the compliance enhanced architecture is operable to establish a link between at least one participant and at least one wallet on the at least one distributed ledger;
    wherein the at least one wallet corresponds to a unique address on the at least one distributed ledger;
    wherein the PEP is operable to receive a proposed transaction by the at least one wallet to transfer at least one digital token representing at least one asset;
    wherein the attribute source module is operable to determine at least one participant attribute attributable to the at least one participant, at least one token attribute attributable the at least one digital token, and/or at least one transaction attribute attributable to the proposed transaction;

wherein the at least one recipe is computer interpretable code of a compliance, regulatory, and/or other governance policy rule and/or ruleset, wherein the other governance policy rule and/or ruleset includes securities laws and/or transaction controls of a jurisdiction;

wherein the at least one recipe includes a Subject Verb Object (SVO) structure in which the at least one participant is assigned as a subject, the proposed transaction is assigned as a verb, and the at least one digital token is assigned as an object;

wherein the rules engine is operable to determine a policy decision by comparing the at least one participant attribute, the at least one digital token attribute, and the at least one transaction attribute to the at least one recipe;

wherein the PEP is operable to determine at least one right to perform the proposed transaction based on the policy decision;

wherein the PEP is operable to permit or deny the proposed transaction based on the presence or absence of the at least one right;

wherein the PEP further includes a token factory;

wherein the token factory is operable to deploy the at least one digital token with an existing token standard through at least one smart contract and extend the existing token standard to include compliance functions of the PEP; and wherein the token factory is operable to update and/or remove token standards over time.

15. The system of claim 14, wherein the compliance functions of the PEP travel with the digital token through a plurality of transactions.

16. The system of claim 14, wherein the digital token represents a security.

17. The system of claim 16, wherein the at least recipe includes rules and regulations for the Securities and Exchange Commission (SEC) and/or other major securities laws.

18. The system of claim 17, wherein the PEP is operable to enforce the rules and regulations of the SEC for a transaction of involving the exchange of the digital token representing a security.

19. A system for enforcing a ruleset for a decentralized financial transaction comprising:

at least one computer processor and at least one memory having instructions stored therein;

a compliance enhanced architecture in network communication with at least one server computer and at least one distributed ledger;

wherein the compliance enhanced architecture includes a Policy Enforcement Point (PEP), a rules engine, at least one recipe, and an attribute source module;

wherein the compliance enhanced architecture is operable to establish a link between at least one participant and at least one wallet on the at least one distributed ledger;

wherein the compliance enhanced architecture is operable to identify a digital identity of the at least one participant and reverify the digital identity at predetermined times;

wherein the at least one wallet corresponds to a unique address on the at least one distributed ledger;

wherein the PEP is operable to receive a proposed transaction by the at least one wallet to transfer at least one digital token representing at least one asset;

wherein the attribute source module is operable to determine at least one participant attribute attributable to the at least one participant, at least one token attribute attributable the at least one digital token, and/or at least one transaction attribute attributable to the proposed transaction;

wherein the at least one recipe is computer interpretable code of a compliance, regulatory, and/or other governance policy rule and/or ruleset, wherein the other governance policy rule and/or ruleset includes securities laws and/or transaction controls of a jurisdiction;

wherein the at least one recipe includes a Subject Verb Object (SVO) structure in which the at least one participant is assigned as a subject, the proposed transaction is assigned as a verb, and the at least one digital token is assigned as an object;

wherein the rules engine is operable to determine a policy decision by comparing the at least one participant attribute, the at least one digital token attribute, and the at least one transaction attribute to the at least one recipe;

wherein the PEP is operable to determine at least one right to perform the proposed transaction based on the policy decision; and wherein the PEP is operable to permit or deny the proposed transaction based on the presence or absence of the at least one right.

20. The system of claim 19, wherein the attribute verification process is separate from the policy enforcement process;

wherein the PEP is operable to provide federated rights assessment, off a distributed ledger, through Security Assertion Markup Language (SAML);

wherein the rules engine is operable to cache the at least one recipe;

wherein the at least one recipe is created manually through a Graphical User Interface (GUI) on a display device in network communication with the at least one server computer wherein the PEP further includes a token factory;

wherein the token factory is operable to deploy the at least one digital token with an existing token standard;

wherein the token factory is operable to extend the existing token standard to include compliance functions of the PEP;

wherein the token factory is operable to update and/or remove token standards over time; and wherein the digital token represents a security.

* * * * *